US008749580B1

(12) United States Patent
Lininger

(10) Patent No.: US 8,749,580 B1
(45) Date of Patent: Jun. 10, 2014

(54) SYSTEM AND METHOD OF TEXTURING A 3D MODEL FROM VIDEO

(75) Inventor: Scott Lininger, Lafayette, CO (US)

(73) Assignee: Google Inc., Mountain View, CA (US)

(*) Notice: Subject to any disclaimer, the term of this patent is extended or adjusted under 35 U.S.C. 154(b) by 104 days.

(21) Appl. No.: 13/209,115

(22) Filed: Aug. 12, 2011

(51) Int. Cl.
*G09G 5/00* (2006.01)

(52) U.S. Cl.
USPC ............. 345/629; 345/594; 345/473; 345/84; 348/224.1; 348/229.1; 348/228.1; 348/771; 348/345; 382/272; 382/100; 382/284

(58) Field of Classification Search
USPC ........ 348/224.1, 229.1, 121, 228.1, 771, 345; 382/272, 100, 284; 345/629, 594, 473, 345/84, 272, 100, 284
See application file for complete search history.

(56) References Cited

U.S. PATENT DOCUMENTS

| | | | |
|---|---|---|---|
| 6,504,571 B1* | 1/2003 | Narayanaswami et al. | 348/231.99 |
| 6,587,586 B1* | 7/2003 | Cui et al. | 382/176 |
| 6,744,441 B2* | 6/2004 | Wu et al. | 345/582 |
| 6,912,293 B1* | 6/2005 | Korobkin | 382/100 |
| 7,561,164 B2* | 7/2009 | Baumberg | 345/582 |
| 7,698,336 B2* | 4/2010 | Nath | 707/737 |
| 7,911,497 B2* | 3/2011 | Russell et al. | 348/143 |
| 8,265,400 B2* | 9/2012 | Yadid et al. | 382/229 |
| 2002/0061194 A1* | 5/2002 | Wu et al. | 396/324 |
| 2003/0085891 A1* | 5/2003 | Lyons et al. | 345/420 |
| 2004/0051711 A1* | 3/2004 | Dimsdale et al. | 345/419 |
| 2005/0021202 A1* | 1/2005 | Russell et al. | 701/35 |
| 2005/0162419 A1* | 7/2005 | Kim et al. | 345/419 |
| 2008/0071770 A1* | 3/2008 | Schloter et al. | 707/5 |
| 2009/0058854 A1* | 3/2009 | Ingersoll et al. | 345/427 |
| 2009/0153577 A1* | 6/2009 | Ghyme et al. | 345/582 |
| 2009/0222432 A1* | 9/2009 | Ratnakar | 707/5 |
| 2010/0156834 A1* | 6/2010 | Sangster | 345/173 |
| 2010/0231590 A1* | 9/2010 | Erceis et al. | 345/426 |
| 2012/0210227 A1* | 8/2012 | Lin | 715/723 |

OTHER PUBLICATIONS

Sinha et al. (NPL Doc, "Interactive 3D Architectural Modeling from Unordered Photo Collections") ACM Transactions on Graphics, vol. 27, No. 5, Article 159, Publication date: Dec. 2008.*
Fruh (NPL Doc, "Constructing 3D City Models by Merging Aerial and Ground Views") Nov./Dec. 2003 Published by the IEEE Computer Society.*
Chopra, "Google SketchUp 7 for Dummies," Wiley Publishing, Inc., Chapter 8 (2009).
Chopra, "Google SketchUp 8 for Dummies," Wiley Publishing, Inc., Chapter 8 (2011).

* cited by examiner

*Primary Examiner* — Abderrahim Merouan
(74) *Attorney, Agent, or Firm* — Dority & Manning, P.A.

(57) ABSTRACT

A method and system for applying photo texture acquired from a video resource to a 3D model operates within a 3D modeling system. The modeling system includes a modeling application operating on a workstation and a storage device containing a video resource. A 3D model is created or edited within the 3D modeling system. For a selected surface, the method and system allow selection of a video resource, selection of a video frame of the video resource, and selection of an area of the video frame to use as a photo texture to apply to the selected surface. The selected area of the video frame is copied and mapped to the selected surface of the 3D model.

14 Claims, 18 Drawing Sheets

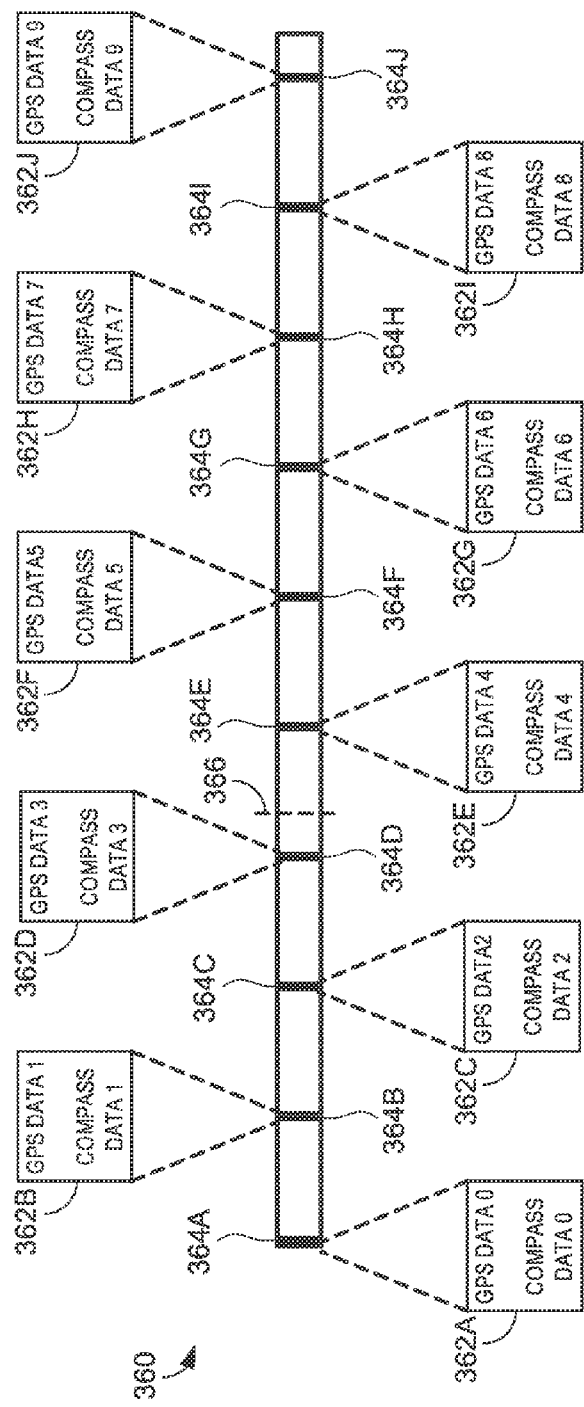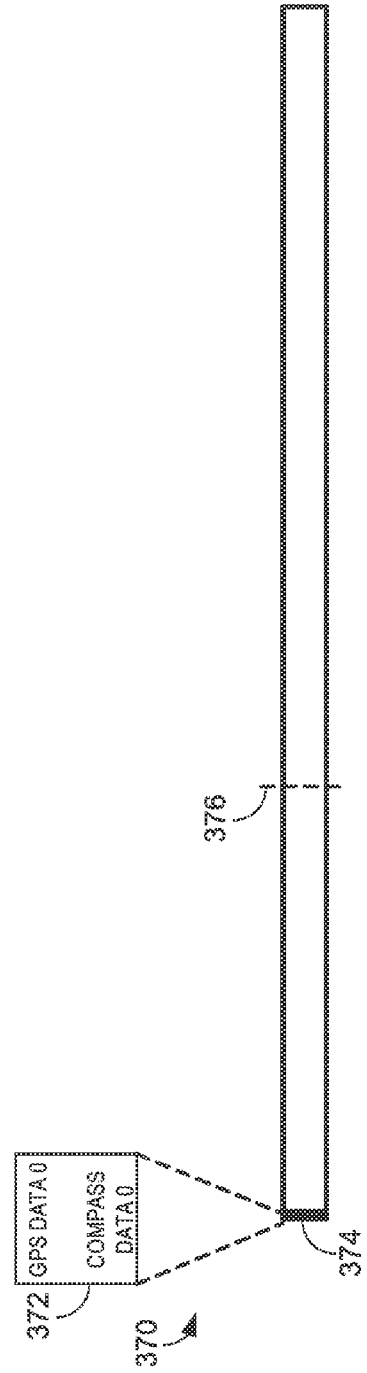
FIG. 9A
FIG. 9B

SYSTEM AND METHOD OF TEXTURING A 3D MODEL FROM VIDEO

FIELD OF TECHNOLOGY

The present disclosure relates to photo texturing of three-dimensional models and, more specifically, to a system and a method configured to photo texture a selected surface of the three-dimensional model by mapping to the selected surface an image of the surface acquired from a video frame of a video resource in which the selected surface appears.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Advances in computer-aided three-dimensional (3D) modeling—both in terms of the number of available software applications and the ease with which the available applications can be used—have facilitated the proliferation of 3D digital modeling through a number of technological areas. Using computer-aided drafting (CAD) programs, digital modeling software, and the like, professionals and novices alike can generate digital, 3D models of buildings, spaces, objects, etc.

One context in which computer-aided 3D modeling has found particular utility is the field of digital cartography. One function of digital cartography is to generate maps that provide accurate visual depictions of an area. In particular, some maps now allow a user to visualize a particular location as it actually appears, by integrating photographic elements from satellite imagery, aerial imagery, and surface imagery with traditional cartographic elements (e.g., information about road locations, geographic features, etc.) and advanced location data (e.g., from the Global Positioning System (GPS)). In some instances, digital maps may allow a user to view an element such as, for example, a building, as a 3D model.

Generally, 3D models depicted in digital maps are created using computer-aided 3D modeling programs. In some instances, the 3D models are untextured. That is, the 3D models depict the shape of the building, but do not accurately depict the building's visual characteristics, such as the building's façade. In other instances, the 3D models are textured using, for example, one or more photographic images of the real-world object modeled. The process of applying a photographic image to a model of a real-world object is referred to as "photo texturing."

The tedious and time-consuming nature of the photo texturing process limits the capacity of most digital map systems to implement accurate 3D modeling of mapped areas. To model and texture a given object, images of the object must be acquired, usually from several angles. In some instances, this may require traveling to the object. Moreover, acquired images may be from a sub-optimal angle, or may not capture a clear view of the surface to be photo textured.

SUMMARY

In an embodiment, a computer-implemented method for applying photo texturing to a 3D model of a real-world object includes receiving a selection of a surface of the 3D model and receiving a request to apply to the selected surface a photo texture acquired from a video resource. Thereafter, the method receives a selection of the video resource from which to acquire the photo texture and a selection of a video frame of the video resource. The method proceeds to receive a selection of an area of the selected video frame to apply as the photo texture to the selected surface. Having received the selection of the area, the method applies the selected area of the selected video frame to the selected surface.

If desired, the computer-implemented method receives geolocation information for a point in a model space in which the 3D model is created and initiates a search of metadata associated with a plurality of video resources to determine one or more video resources according to the received geolocation information. Further, if desired, the computer-implemented method receives geolocation information for a point in a model space in which the 3D model is created and uses information stored as metadata with the selected video resource to determine a video frame of the video resource to display.

In another embodiment, a system includes a storage device storing a plurality of video resources, a display device, and a processor communicatively coupled to the storage device and to the display device. The system also includes a memory device storing a set of machine readable instructions executable by the processor and operable to cause the processor to facilitate the creation of a 3D model in a 3D space represented on the display device, to receive a selection of a surface of the 3D model, and to receive a request to apply to the selected surface a photo texture acquired from a video resource stored on the storage device. The instructions also cause the processor to receive a selection of the video resource from which to acquire the photo texture and to receive a selection of a video frame of the video resource. Lastly, the instructions cause the processor to receive a selection of an area of the selected video frame to apply as the photo texture to the selected surface, and to apply the selected area of the selected video frame to the selected surface.

In yet another embodiment, a tangible, non-transitory computer-readable medium stores machine instructions operable to cause a processor to create a 3D digital model of a real-world object, to receive a selection of a surface of the 3D model, and to receive a request to apply to the selected surface a photo texture acquired from a video frame of a video resource. In response to the request, the instructions cause the processor to receive a selection of the video resource that includes the video frame from which to acquire the photo texture and to receive a selection of the video frame of the video resource. Thereafter, the instructions cause the processor to receive a selection of an area of the selected video frame to apply as a photo texture to the selected surface, and apply the selected area of the selected video frame to the selected surface.

BRIEF DESCRIPTION OF THE DRAWINGS

FIG. 9A depicts an exemplary video file having geotagging metadata associated with a number of bookmarks in accordance with a presently described embodiment.

FIG. 9B depicts an exemplary video file having geotagging metadata associated with the video file in accordance with a presently described embodiment.

DETAILED DESCRIPTION

Figure 1A:
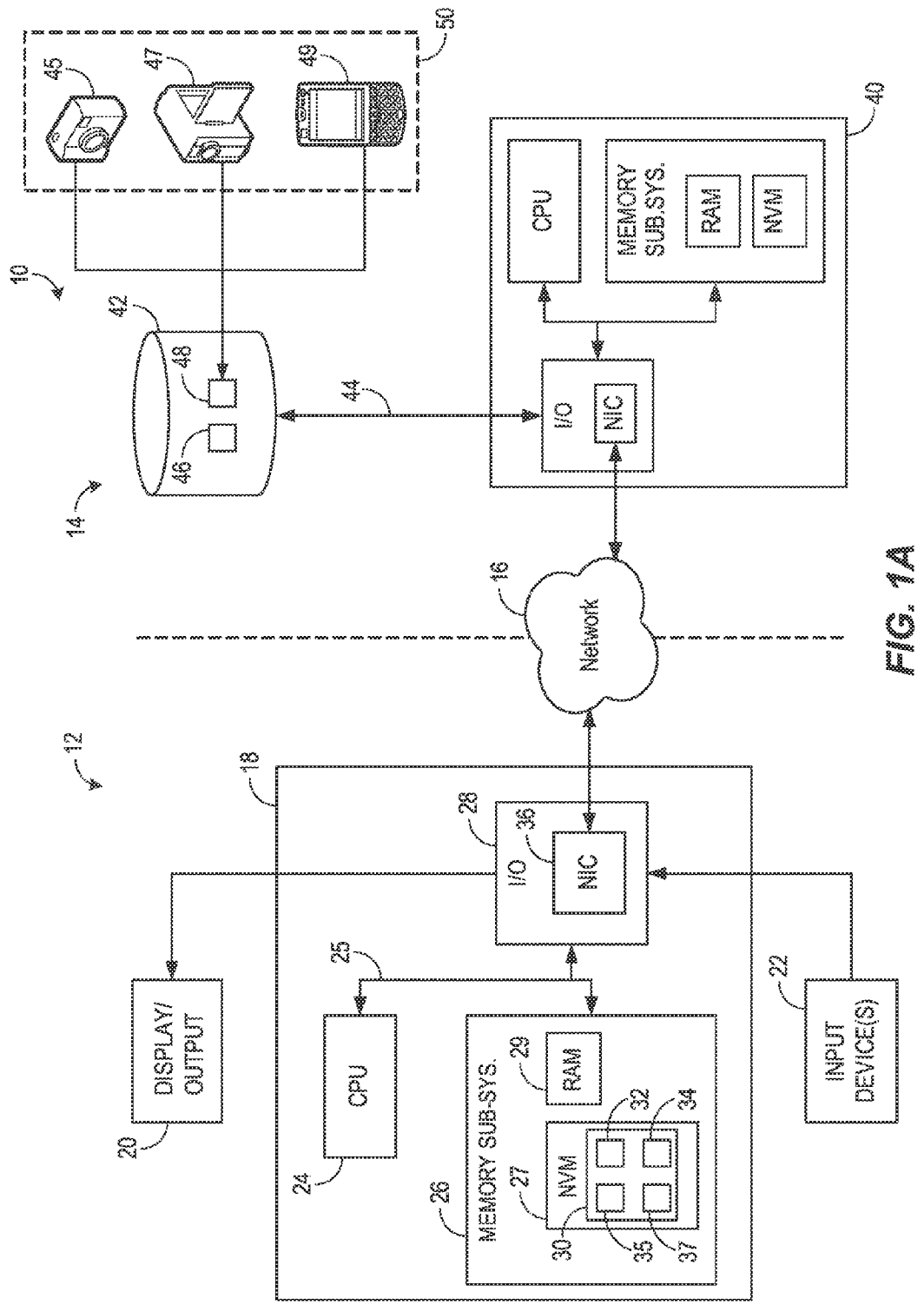
FIG. 1A is a block diagram of an exemplary system for video photo texturing a 3D model in accordance with a presently described embodiment.

A computer-implemented method or a computer system or a computer-readable medium storing a set of instructions for execution on a processor operates to apply a photo texture, acquired from a video resource, to one or more surfaces of a 3D model of a real-world object. Upon receipt of a selection of a surface of the 3D model, and a request to apply to the selected surface a photo texture from a video resource, the method or apparatus receives a selection of a video resource from which a video frame will be selected to use to photo texture the selected surface. The method or apparatus receives a selection of the video frame to use, and identifies an area of the video frame to apply to the selected surface. The method or apparatus then photo textures the selected surface by applying the identified area of the video frame to the selected surface.

In various embodiments, the method and apparatus may receive geolocation information for one or more points in a 3D space in which the 3D model is created. The method and apparatus may initiate a search of video resources stored locally and/or video resources stored remotely (e.g., web-hosted). The method and apparatus may also initiate a search of metadata of a selected video resource to determine one or more potential video frames from which an area of the video frame could be selected.

Generally speaking, a 3D modeling system allows a user to design 3D models, for example, for architectural, civil and mechanical design purposes, or for digital modeling and/or rendering of any 3D object. For example, a 3D modeling system may allow an architect to render a new building design in 3D such that the building can be displayed from any angle. An interior designer may design a space and display the space to a client as it would appear as the client entered the space from one or more directions, in various lighting conditions, or with various design options. An engineer may design a consumer device, such as a mobile phone, viewing it from all angles to gauge its aesthetic appeal.

Generally, the realism of such models is limited by the amount of time and effort available to provide detail to each of the modeled surfaces. For example, an architect may spend countless hours programming the surfaces of a 3D model to have just the right surface texturing (e.g., a brick façade), to include doors and windows, to reflect light in just the right manner, etc. Sometimes, however, it is desirable to model an existing building (as opposed to a building being designed) in a fast and efficient manner. This may be the case where, for instance, an architect is modeling the site of a new building, e.g., including the existing buildings around the structure being designed. In these instances, it is significantly more efficient to apply to the models images of the existing buildings as they exist. By doing so, it is possible to create 3D models with a high degree of realism in an expeditious manner. The process of adding surface texture (e.g, color, detail, etc.) to a digitally rendered 3D model is called "texture mapping." "Photo-texturing" is the process of texture mapping a digital image (such as a scanned photograph, a digital photograph, etc.) to a surface of a digitally rendered 3D model.

Of course, in order to apply a photo-texture to a surface of a 3D model, it is necessary first to have a photograph of the surface. Generally, where the object is a structure, this may require traveling to the location of the structure and acquiring suitable images (e.g., with a digital camera) of any surface of the structure that is to be photo-textured. Alternatively, one or more existing images may be used to photo-texture a surface or surfaces of the structure.

In any event, a user desiring to apply a photo texture to a surface of a 3D model, having determined an image to apply, may select a portion of the image that depicts a surface corresponding to the surface of the 3D model to which the photo texture will be applied. Selection of the area could be accomplished by drawing a polygonal (e.g., rectangular) shape over the digital image, locating crosshairs indicative of vertices of such a polygon, drawing a freehand selection area, sizing and/or locating a pre-determined polygon (e.g., corresponding to the shape of the surface to be photo-textured), etc. The selected portion of the image may then be mapped to the surface of the 3D model by UV mapping, as discussed below.

A database of digital photographic and/or video images may provide a ready source of existing images that could be used to photo-texture surfaces of structures modeled in 3D. The database may include photographic and/or video images of structures within some area. For example, a database may include photographic and/or video images of structures on one block, images of structures in a particular city, images of structures in a particular country, etc. In some embodiments, for ease of locating in the database a particular structure, each of the photographic and/or video images may be associated with information (i.e., the images may be "tagged") indicating the location from which the image was captured. The location indication may be in any appropriately searchable form including, by way of example and not limitation: latitude and longitude, intersection, street address, zip code, distance and direction from a known, fixed point, etc. The identification of a geographic location of a real-world object (e.g., a structure, a camera) is referred to herein as "geolocation." An object for which a geographic location has been identified is said to be "geolocated." The association (e.g., by metadata) of geolocation information with a file (e.g., a digital image) is referred to herein as "geotagging." A file (e.g., an image file) having associated metadata indicative of a geolocation (e.g., a geolocation of the camera at the time the image was captured) is said to be "geotagged."

The database of digital photographic and/or video images may be populated with geotagged images recorded by, for example, a digital camera, operable to record still images or video images, and having a GPS unit that allows the camera to geolocate. The digital camera may be a digital still camera, a digital video camera, a digital single-lens reflex (DSLR) camera, etc. Throughout the remainder of this description, all devices for capturing still or video imagery for population in the database of digital still and video imagery will be referred to, respectively, as image capture devices and video capture devices and, collectively, as capture devices. In some embodiments, the metadata associated with the images may include more information than just a simple location of the image or video capture device at the time the images were captured. For example, the metadata may include the direction the capture device was facing when the images were captured, the focal point of the lens, the height and/or angle of the capture device with respect to the ground, the zoom level of the lens, the distance from the capture device to nearby objects, etc. In some embodiments, some or all of the photographic and/or video images may have less or no associated metadata and, specifically, may lack metadata indicative of the direction the capture device was facing as the images were captured and may lack metadata indicative of the location of the capture device when the images were captured.

FIG. 1A, depicts a block diagram of an embodiment of a system 10 for photo texturing a 3D model. The system 10 includes a user-side system 12 and a server side system 14 communicatively coupled to each other by network 16. The user side system 12 includes a user workstation 18. The user workstation 18 includes, or is communicatively coupled to, a display 20 and one or more input devices 22, such as a keyboard, a mouse, a trackpad and/or touchpad, a touch-sensitive screen, a gesture tracking system, or any other known input method. Of course, the input device 22 may be separate from the display 20 or may include the display 20 (e.g., where the input device 22 is a touch-sensitive display). The user workstation includes a processor 24, a memory 26, and an input/output (I/O) interface 28.

The I/O interface 28 couples the display 20 and the input devices 22 to a bus 25 in the workstation 18, which bus 25, in turn, communicatively couples the I/O interface 28 to a processor 24 and a memory sub-system 26. The processor 24 may be any processor capable of executing one or more programs stored in the memory sub-system 26 (as described below) to perform the specific tasks associated with the 3D photo-texturing application herein described and, in particular, may be a general purpose processor, a digital signal processor, a field programmable gate array (FPGA), an application specific IC (ASIC), etc. The processor 24 may operate to retrieve one or more applications 30 from the memory sub-system 26 and to execute the applications 30. An exemplary workstation 18 includes an operating system (OS) 32 such as Windows, Mac OS, Linux, Android, etc. The exemplary workstation 18 may also store in the memory sub-system 26 a software application 34 embodying the 3D modeling application. For simplicity, the term "software application" is used herein to refer both to an instance of a software application executing in the workstation 18 and to the set of computer instructions that defines the software application. However, it will be understood that while an instance of an application executes in the workstation 18, machine-readable instructions of the application are stored on a non-transitory, computer-readable medium such as a persistent memory 27, a system cache 29, or both. The persistent memory 27 may be a hard disk, a flash drive, a CD, a DVD, a tape drive, etc. In at least some of the embodiments, the persistent memory 27 is significantly slower that the system cache 29. In particular, the persistent memory 27 may have one or more of a slower read speed, a slower write speed, a lower bandwidth (i.e., the size of a data block the persistent memory 27 can supply to the CPU 24 at one time), etc.

The OS 32 executes on the processor 24 ("central processing unit" or "CPU") that includes one or several CPU cores, depending on the embodiment. The workstation 18 also includes the system cache 29 that may be implemented as a quickly-accessible, physical memory such as random access memory (RAM). In general, the system cache 29 may be provided on a same chip as the CPU 24 or on a separate chip. In some embodiments, the system cache 29 is a dedicated memory region on a RAM chip. During operation, the system cache 29 operates as an active storage, so that software tasks such as the application 30 access memory pages (or simply "pages") stored in the system cache 29 quickly and efficiently. While the application 30, including the OS 32 and the 3D modeling application 34, are generally described above as being stored on the persistent memory 27 and/or the system cache 29, the applications 30 may be stored on the server side system 14, on another workstation 18 on the user-side system 12, or some combination of the two.

With continued reference to FIG. 1A, the workstation 18 and, in particular, the I/O interface 28, may include a network interface card (NIC) 36 via which the workstation 18 may be coupled by the communication network 16, which may be the Internet, for example. Specifically, the workstation 18 may communicate via the network 16 with a server 40 on the server-side system 14, which may, in turn, be in communication, for example over a local area network (LAN) 44, with one or more databases 42.

The server 40 may be configured similarly to the workstation 18, in that it may include one or more displays, CPUs, memory sub-systems, I/O interfaces, input devices, etc. Moreover, while described herein as a single server, the server 40 may be any number of servers 40 according to the architecture of the network 16, the LAN 44, server loading and/or demand parameters, etc. Additionally, multiple servers 40 need not be affiliated with the same entity or company, need not serve the same purpose, etc. For example, a first server 40 may be affiliated with a video sharing service, and have a first database 42 storing video imagery, while a second server 40 may be affiliated with a photo sharing service and have a second database 42 storing photo imagery, and a third server 40 may be affiliated with a digital cartography and navigation service and have a third database 42 storing maps, satellite imagery, etc.

As described in greater detail below, the server 40 generally operates to receive from the workstation 18, via the network 16, one or more requests generated by the 3D modeling application 34 and, in response to the request, to retrieve information from the database 42 and transmit the retrieved information back to the workstation 18, again via the network 16. The server 40 may complete one or more processing steps before and/or after retrieving the information from the database 42, such as, by way of example and not limitation, calculating a value using as input the information from the database 42 or performing a lookup of a database index value.

Additionally, in some embodiments, the server 40 may store one or more applications, including the 3D modeling application 34. In these instances, the workstation 18 may receive the application 34 from the server 40 and execute the application 34 locally on the workstation 18. In alternate embodiments, the application 34 may be stored and executed on the server 40, and the server 40 may provide only display and/or user-interface data via the network 16 to the workstation 18. That is, the workstation 18 may serve as a display and/or interface terminal for the application executed on the server 40.

In still other embodiments, the application 34 is stored in the memory sub-system 26 and executed by the CPU 24 on the workstation 18, and interacts with a second application (not shown) stored and executed on the server 40. The second application may be, by way of example and not limitation, an interactive map application that retrieves (e.g., from the database 42) and/or renders maps, satellite imagery, terrain data, etc. for display on an output device such as the display 20, provides an interactive user interface to allow a user to zoom in on a desired location, pan to a desired location, select various types of data on the map or the satellite image, etc. In one such embodiment, the second application provides two-dimensional and three-dimensional representations of geographic regions. A user may view a two-dimensional satellite image of a certain location and dynamically switch to a three-dimensional view of the location. At the time when the second application transitions from a two-dimensional rendering to a three-dimensional rendering, the second application at least sometimes requests additional resources such as bitmap images, modeling data, etc. Further, in some cases, the second application invokes additional sets of functions, such as rendering functions for three-dimensional graphics, stored in a corresponding dynamically linked library (DLL), for example.

The information retrieved and/or used by the second application may be stored in the database 42. Specifically, the database 42 may include map data, satellite imagery, terrain data, imagery captured from a pedestrian and/or vehicular perspective (e.g., views of buildings taken from a street or a pedestrian walkway), panoramic imagery, video captured from a pedestrian, aerial, or vehicular perspective, etc., any and/or all of which may or may not have associated with it meta-data including: a location from which an image or video was captured; a type of capture device and/or lens used to capture the image or video; an angle of a capture device relative to the ground and/or relative to a velocity of the capture device; a heading and or velocity of a capture device and/or the device's viewport when an image or video is captured; a zoom level of an image or video captured; and any other parameter desired. In some embodiments, the database 42 includes a data store 46 of map and satellite images and associated data and a data store 48 of images and video captured associated data. Of course, the data stores 46 and 48 may be on a single database 42, may be on separate databases 42, or may each or collectively be spread across multiple databases 42.

Where the database 42 and, in particular, the data store 46, includes video imagery, each video file, as generally known, comprises a number of individual images captured and stored sequentially such that playback appears to a viewer to show moving imagery. The video imagery may be captured by any of several means and, in particular, may be captured by a video capture device 50 such as a camera 45 having a video function, a dedicated video recorder 47, or any other device capable of capturing video imagery, including, but not limited to a smart phone 49, a tablet computer, a laptop computer, a netbook computer, a portable media player (PMP) device, etc. The video capture device 50 may be carried by a pedestrian 52, mounted on and/or in a vehicle (not shown) (e.g., a bicycle, an automobile, a motorcycle, a cart, a tricycle, a snowmobile, etc.), etc. The video capture device 50 may, in some embodiments, include a video capture device having hardware and/or software operable to allow the video capture device 50 to capture a 360-degree view. In an embodiment of the video capture device 50, one or more Global Positioning System (GPS) units (not shown) operate to determine the location of the video capture device 50 at the commencement of recording and/or as video is captured, and data from the GPS unit is stored as metadata with the video in the data store 46. The video capture device 50 may also include various computer equipment (not shown), including one or more processors, memory subsystems, displays, input devices, communication media, etc., which may function to control the video capture device 50, capture and store video and metadata, transmit the stored video imagery and metadata to another device (e.g., the data store 46), etc. In some embodiments, the video capture device 50 stores data locally on a memory subsystem (e.g., on a memory card, a recordable optical medium, a FLASH device, etc.) and, at a later time, transfers the captured video data and metadata to the data store 46. In some embodiments, the video capture device 50 is communicatively coupled to the data store 46 and stores data in the data store 46 as the data is captured.

Figure 1B:
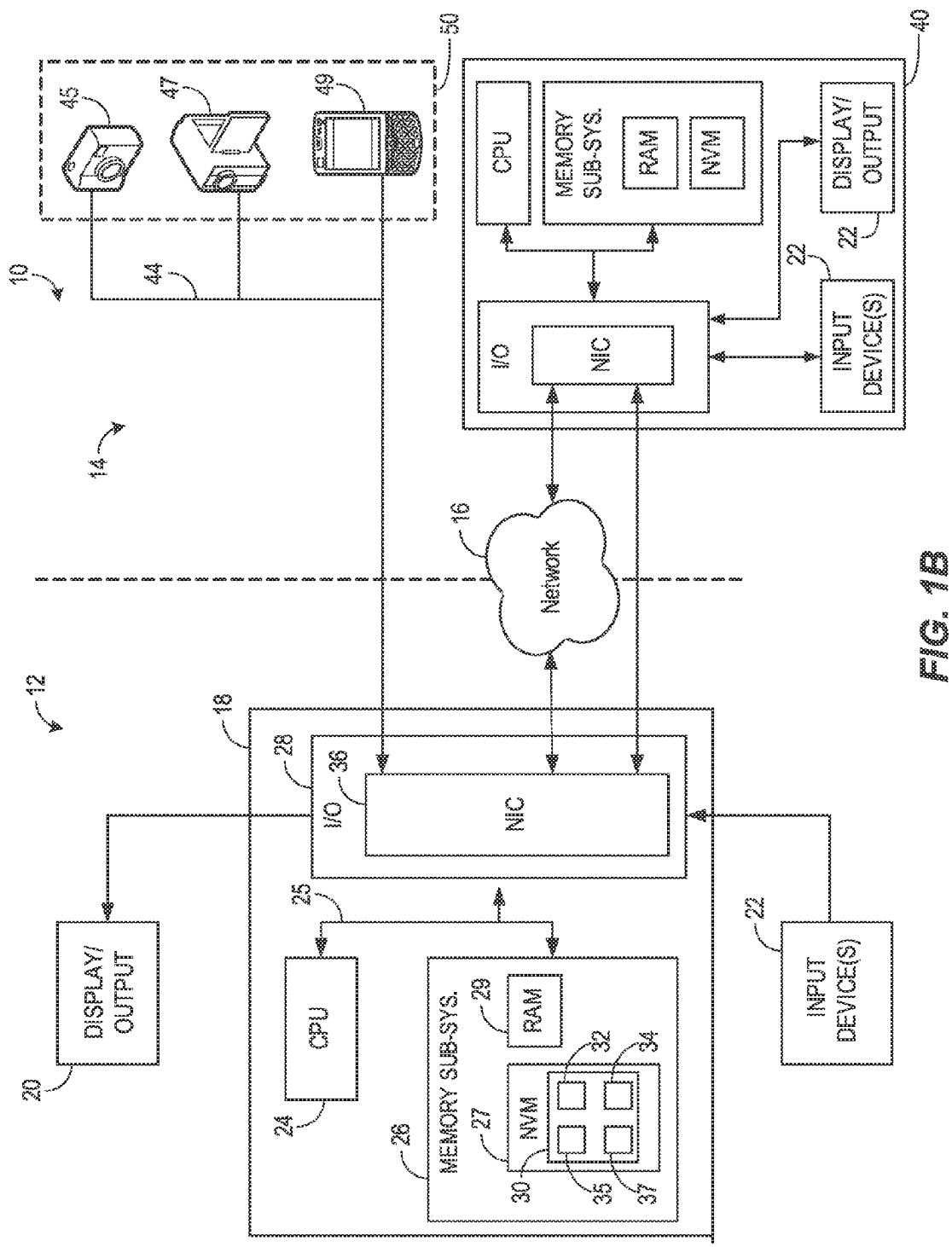
FIG. 1B illustrates a second exemplary system for video photo texturing a 3D model in accordance with a presently described embodiment.

In some embodiments, the video capture device 50 may be communicatively coupled directly to the workstation 18 via the network interface card 36 or via another interface on the I/O interface 28, either while video data is captured or at a later point in time. FIG. 1B illustrates an embodiment in which the video capture device 50 is coupled to the NIC 36.

Figure 2A:
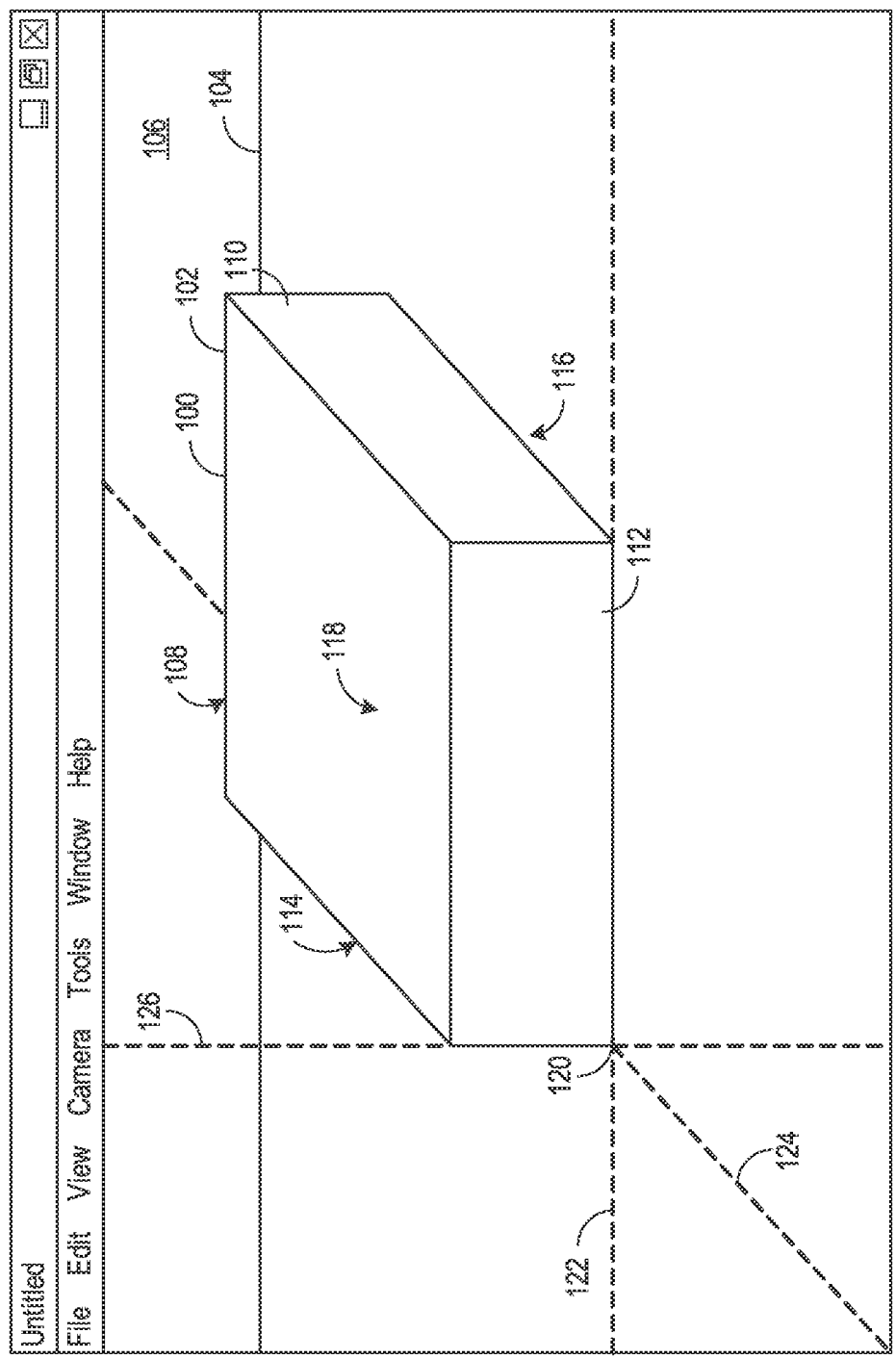
FIG. 2A depicts an application window displaying an exemplary 3D model.

With reference now to FIG. 2A, a person using the 3D modeling system to model a structure may create a 3D model of the structure. FIG. 2A depicts a 3D model 100 of a structure 102 set on a ground plane 104 in a 3D program space 106, as the 3D model 100 might be depicted on the display 20. The structure 100 includes generally planar sides 108, 110, 112, and 114 that are generally perpendicular to the ground plane 104, which is coincident with a bottom face 116 of the 3D model 100. A planar surface, generally parallel to the ground plane 104 (and to the bottom face 116), forms a top face 118 of the structure 102. It is worth noting the ground plane 104 need not necessarily correspond to the bottom face 116 of the 3D model 100, but could instead correspond to the top face 118 of the 3D model 100, one of the sides 108, 110, 112, and 114 of the 3D model 100 and, in fact, need not correspond to any side or face of the 3D model 100. However, throughout this specification the 3D model 100 is described as modeling an above-ground section of a real-world building and, thus, for ease, the ground plane 104 will be described as corresponding to the bottom face 116 of the 3D model 100.

Figure 2B:
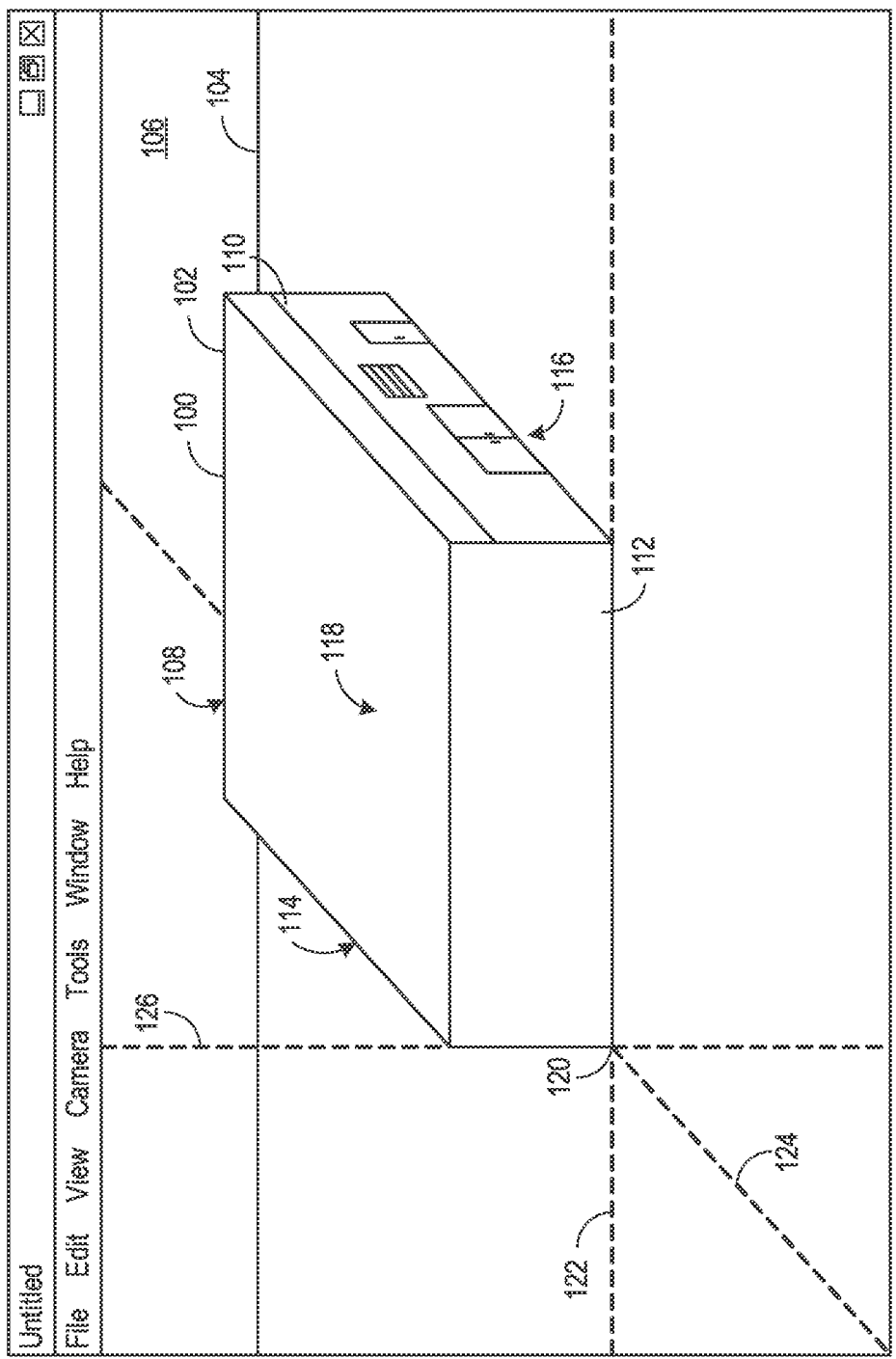
FIG. 2B depicts the application window of FIG. 2A displaying the 3D model with a photo textured face.

The system 10 may allow a user to select a surface of the 3D model 100 to texture. As used in this specification, the word "texture" refers to application to a surface of detail conveying texture. For example, a surface of a 3D model generally may be textured by applying to the selected surface a brick pattern, a concrete pattern, a glass façade pattern, a wood siding pattern, etc. The 3D modeling application 34 and, in particular, a video photo texturing routine 35 (stored, for example, in the non-volatile memory 27 of the memory sub-system 26 on the workstation 18, and executed by the processor 24) described in this specification, textures a surface by applying to the selected surface of the modeled structure 102 an image of a corresponding surface of a real-world structure (not shown). Throughout this specification, this is referred to as photo-texturizing (or photo texturing). For example, after photo texturing, the side 110 of the 3D model 100 depicted in FIG. 2A may appear as depicted in FIG. 2B. Generally, photo texturing requires acquiring an image (e.g., from a digital photograph or a frame of a video) of the surface to which the photo texture is to be applied (and, possibly, manipulating an apparent viewing angle of the image to match that of the 3D model 100), and selecting the portion of the acquired image to apply to the selected surface. This is often a tedious, time-consuming process.

The database 42 may, in some instances, store geotagged photographic or video imagery that may be used by a 3D modeling application 34 for photo texturing. For instance, the database 42 may store photographic or video imagery with associated geotagging metadata that indicates the location at which each image, video, segment of video, and/or frame of video was captured. In some instances, the geotagging metadata may be stored and/or searchable by latitude and longitude, by address, by reference to a particular point or feature (e.g., "100 feet north of the intersection of Main Street and First Avenue"), or by any other desirable reference system. This may allow a user to search for a previously captured photographic or video image of the structure modeled by the 3D model 100, rather than requiring the user to acquire the photographic or video image personally. The user may then select the portion of the photographic image or video frame to apply to the selected surface as a texture, manipulate the perceived viewing angle of the selected portion, and apply the selected portion of the image to the selected surface. This remains a tedious (if slightly less time-consuming) process.

If geotagged photographic or video imagery of the 3D model 100 exists in the database 42, the video photo texturing routine 35 may, in some instances, be able to apply one of the images as texture to the 3D model 100. To do this, the video photo texturing routine 35 must have information about the location of the 3D model 100 in the 3D program space 106 of the modeling application 34. That is, the 3D model 100 must be geolocated within the modeling application 34. Once the 3D model 100 is geolocated such that the modeled structure's real-world location is known, the video photo texturing routine 35 may access the database 42, determine whether appropriate imagery exists for the modeled structure, select, or allow a user to select, an appropriate photographic or video image or portion of an image to apply as texture to a selected surface of the 3D model 100, and apply the selected image or portion of an image to the selected surface. This process is described in greater detail below.

Referring again to FIG. 2A, the 3D program space 106 may be depicted on the display 20 as having an origin 120 at the intersection of X, Y, and Z-axes 122, 124, and 126, respectively. The 3D model 100 may be disposed within the 3D program space 106 such that an intersection of three planes (e.g., the sides 114 and 112 and the bottom face 116) is situated at the origin 120, as depicted in FIG. 2A. Of course, while it may be preferable to some users for the 3D-model 100 to have a surface (e.g., the bottom face 116) coincident with the plane defined by the X- and Y-axes 122 and 124, respectively, such alignment is not required.

The 3D program space 106 may be geolocated, before or after creating the 3D model 100, to establish the real-world location of the modeled structure. For example, a user may operate a user-interface of the modeling application 34 to cause the modeling application 34 to commence a geolocation routine 37 (see FIGS. 1A, 1B) (e.g., by using an input device to "click" a "button" in the user-interface, to select a "geolocate" or "add location" menu item, etc.). The geolocation routine 37 may cause the display 20 to display a dialog box, to display a new "window," to change to display a different screen, etc. The geolocation routine 37 may be part of or separate from the modeling application 34, may be executed locally on the workstation 18 or remotely on the server 40, and may use data stored on the workstation 18 or data stored in the server 40 or the database 42. In any event, the geolocation routine 37 allows the user to geolocate the 3D model 100 in the 3D program space 106 of the modeling application 34. Specifically, the geolocation routine 37 accesses a database (such as, for example, the database 42) of geotagged imagery and/or maps, and displays the imagery and/or maps on the display 20.

Figure 3:
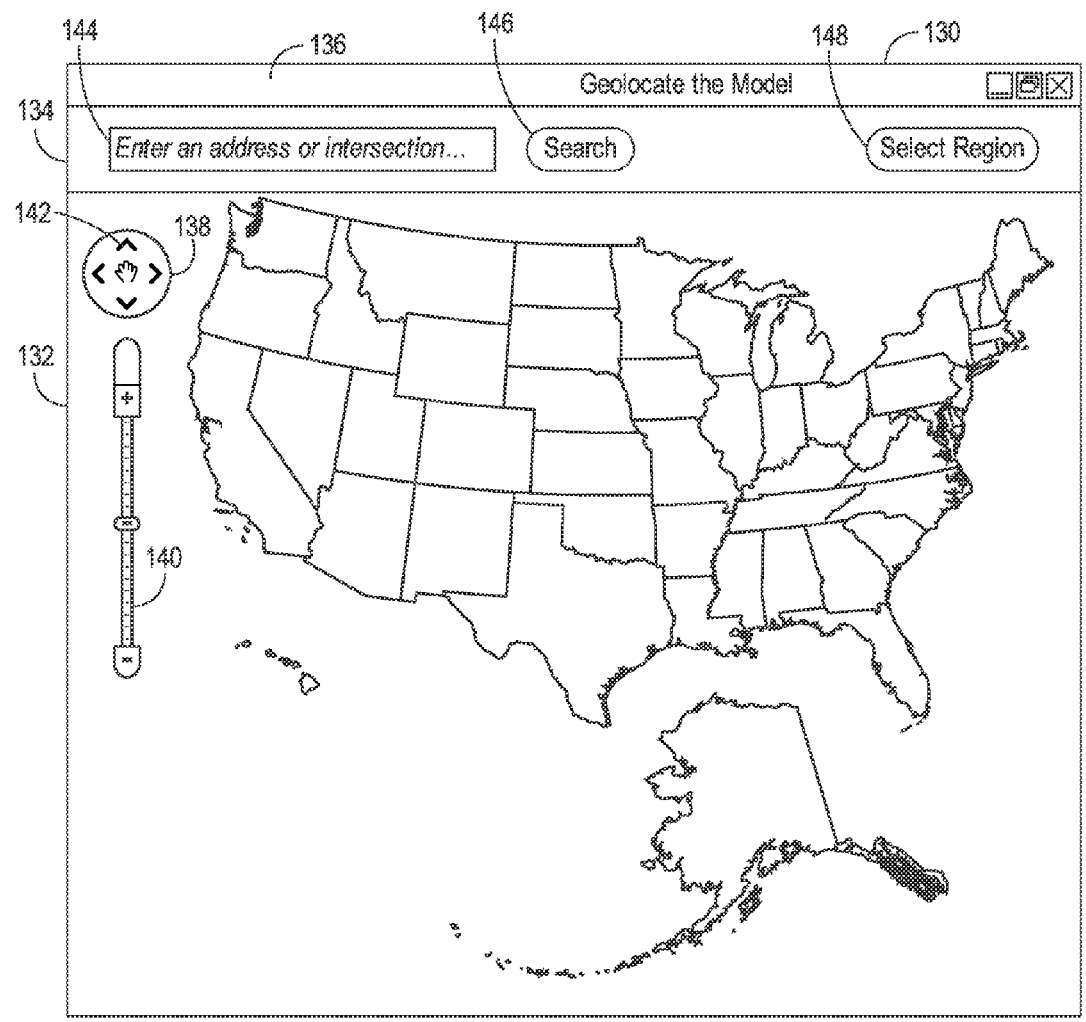
FIG. 3 depicts a first screen of a dialog box displayed during execution of a geolocation routine in accordance with a presently described embodiment.

FIG. 3, depicts one embodiment of a dialog box 130 that may be displayed on the display 20 in response to activation of the geolocation routine 37. The dialog box 130 may include a map or imagery display area 132, navigation bar 134, and a title bar 136. The map or imagery display area 132 may, for example, default to displaying an initial view, such as the view of North America, depicted in FIG. 3. Alternatively, the map or imagery display area 132 may default to any other view, such as a view of a continent, country, or city specified by a user, or to a view of the Earth. The default view displayed in the map or imagery display area 132 may be a graphical map, a satellite image, or some combination of a map and a satellite image. The map or image display area 132 may also include a pan control 138 and a zoom control 140. The pan control 138 allows the user to select one of four directional indictors 142 on the pan control 138. Each directional indicator 138 pans the map in the indicated direction. The zoom control 140 allows the user to zoom in and/or out on the location currently at the center of the display area 132. In some embodiments, a user may also manipulate the display area 132 with an input device by, for example, "dragging" the map with a mouse to pan, or "clicking" on the map to zoom in on a particular point.

For any particular image and/or map displayed in the display area 132, each pixel may be mapped to a set of coordinates to indicate the location of the pixel. The data for given pixels may be stored in the database 42 or may be calculated with reference to one or more reference points upon accessing the image and/or map. For instance, the image depicted in the display area 132 of FIG. 3 may have associated with it in the database 42 metadata indicating the coordinates of one or more reference points (e.g., a center point, a corner, multiple corners) (not shown), the resolution of the image (e.g., 800 pixels×350 pixels), the change per pixel in each coordinate value, etc. In this manner, the workstation 18 and/or the server 40 may provide to the geolocation routine 37 the geolocation of each pixel. The coordinates may be selected from any coordinate system desirable for a mapping the available area (e.g., the surface of the Earth) and, in at least some embodiments, the set of coordinates comprises a latitude and a longitude. As the image and/or map is zoomed in (i.e., as the resolution of the displayed area is increased, for example, by manipulating the zoom control 140), the accuracy and/or the precision of the set of coordinates associated with each pixel in the display area 132 may increase. At some minimum zoom level, the metadata for a particular image and/or map may include multiple sets of coordinates. For example, when the zoom control 140 is adjusted to "street level" (i.e., when individual streets are visible in the display area 132), each pixel may be associated with a first set of coordinates (e.g., a latitude and a longitude) and a second set of coordinates (e.g., a nearest street address).

Figure 4:
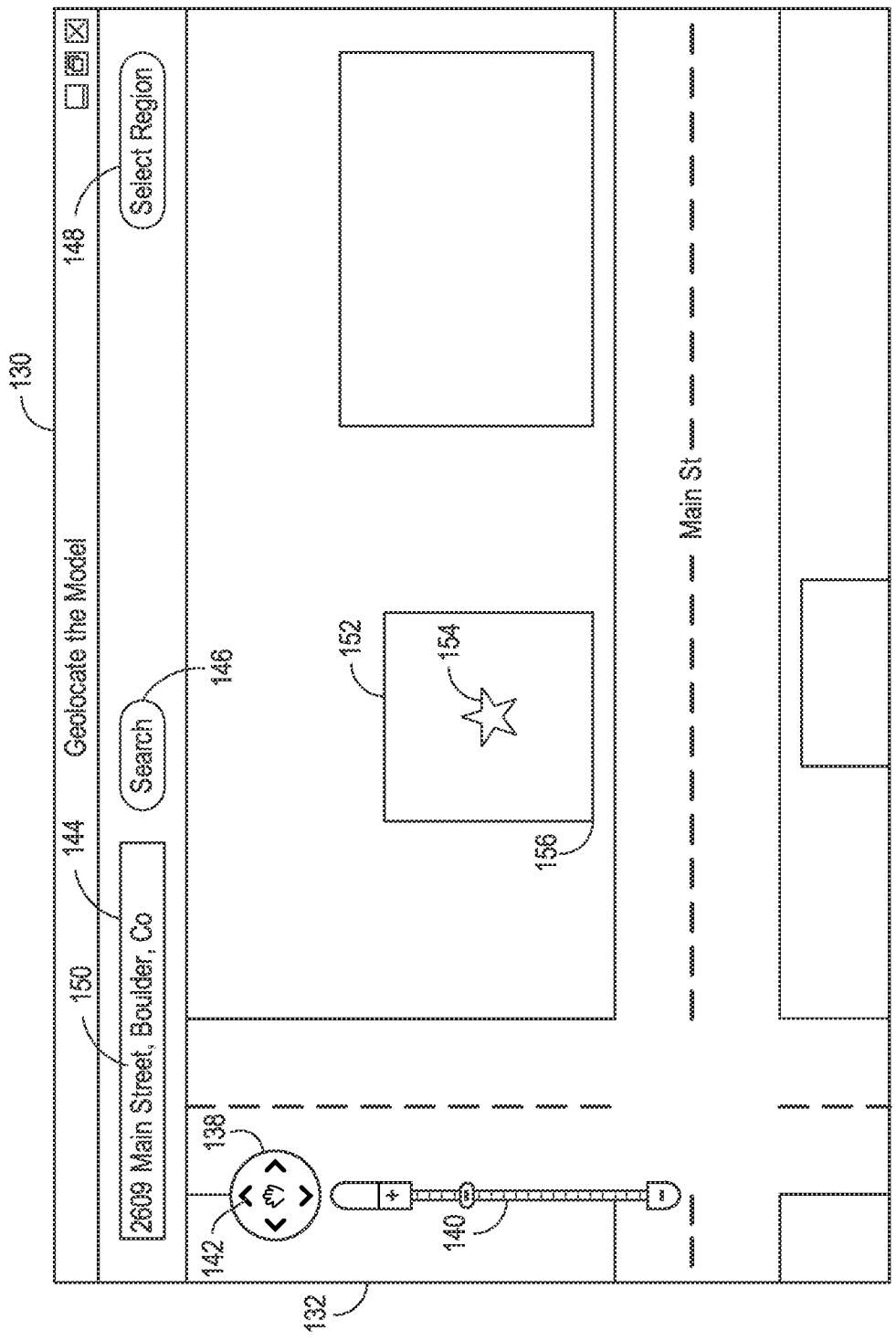
FIG. 4 depicts another screen of the dialog box of FIG. 3.

The navigation bar 134 on the dialog box 130 may include a search field 144, into which a user may type a search term. For example, the search term could be an address, an intersection, a state, a country, a landmark name, a business name, a latitude and longitude, etc. After entering a search term into the search field 144, the user may cause a search to be executed by, for instance, pressing the "Enter" key on a keyboard, or using a pointing device (e.g., a mouse) to "depress" a "Search" button 146. FIG. 4 depicts the dialog box 130 displaying an exemplary search result. The search field 144 has in it an address 150. The display area 132 in FIG. 4 depicts the area around the address 150 entered into the search field 144. A building 152 having the same address as the address 150 entered into the search field 144 is marked with a star 154.

Figure 5:
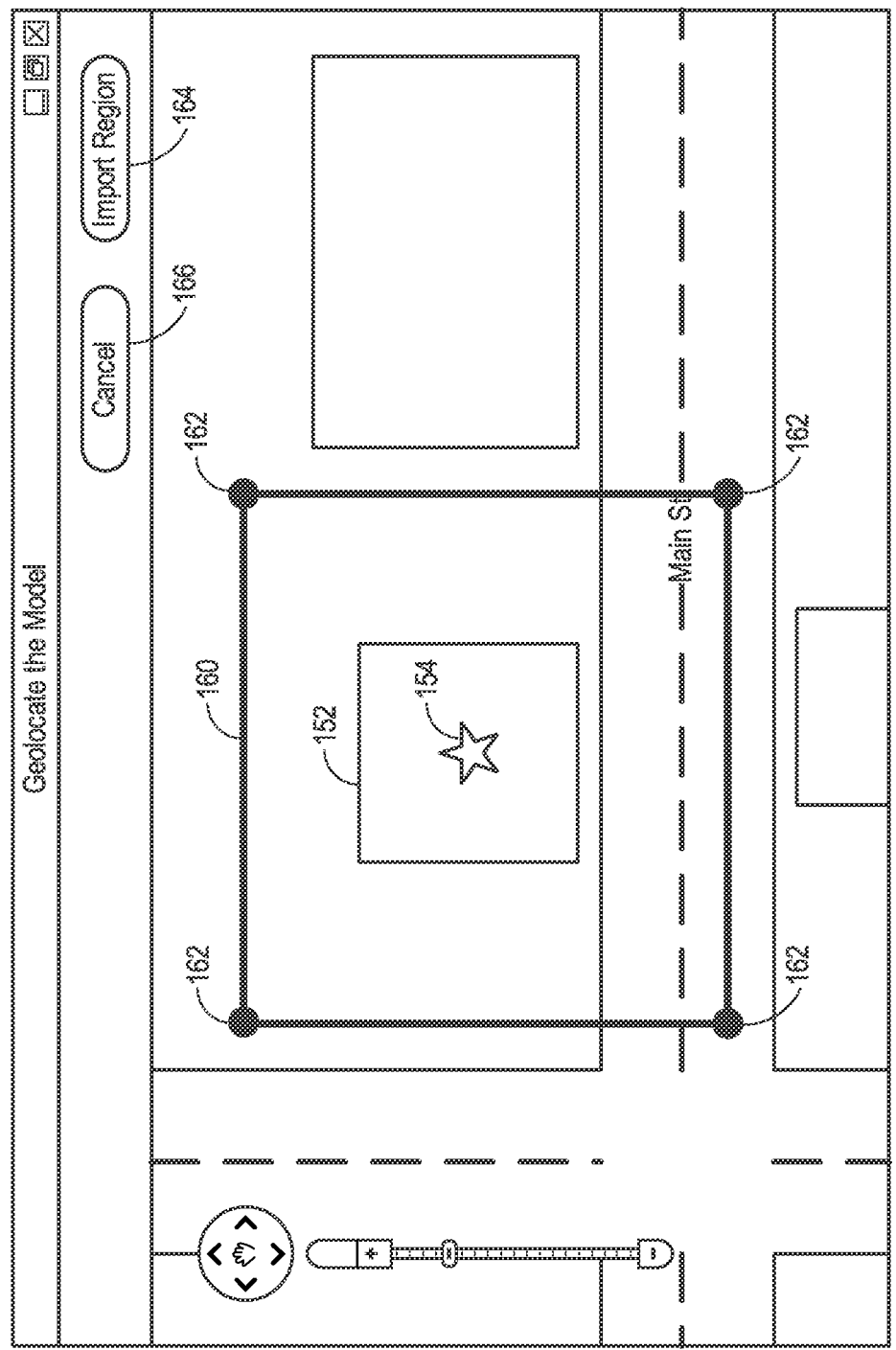
FIG. 5 depicts yet another screen of the dialog box of FIG. 3.

Once the desired area is displayed in the display area 132, a user may geolocate one or more points of the 3D model 100 in the 3D program space 106. In some embodiments, the user may select in the dialog box a particular point, such as a corner 156 of the building 152, and may associate the point with a point in the 3D program space 106. For example, the user may associate the corner 156 with the origin 120, with a point on the 3D model 100, or with any point in the 3D program space 106. By doing so, the set of coordinates of the selected point in the display 132 becomes associated with the selected point (e.g., the origin 120) in the 3D program space 106. In some embodiments, the user may instead activate a user interface control 148 (e.g., using an input device to select a button) and select a region of the display area 132 to import into the 3D program space 106. For example, and with reference to FIG. 5, activation of the control 148 may cause the dialog box 130 to display, in the same dialog box 130 or in a separate dialog box (not shown) a selection control 158. The selection control 158 may be, by way of example, a bounded area 160 adjustable by moving one or more of a plurality of vertices 162, each of which vertices may have associated with it a set of coordinates. Alternatively, the selection control 158 may be a fixed-shape (e.g., square, rectangular, circular, etc.) selection window having an adjustable size or even having a fixed size. In any event, controls 164 and 166 may, respectively, allow the user to import into the 3D program space 106 the region indicated (e.g., by the bounded area 160) or to cancel the selection and to return, for example, to the display depicted in FIG. 4.

Figure 6:
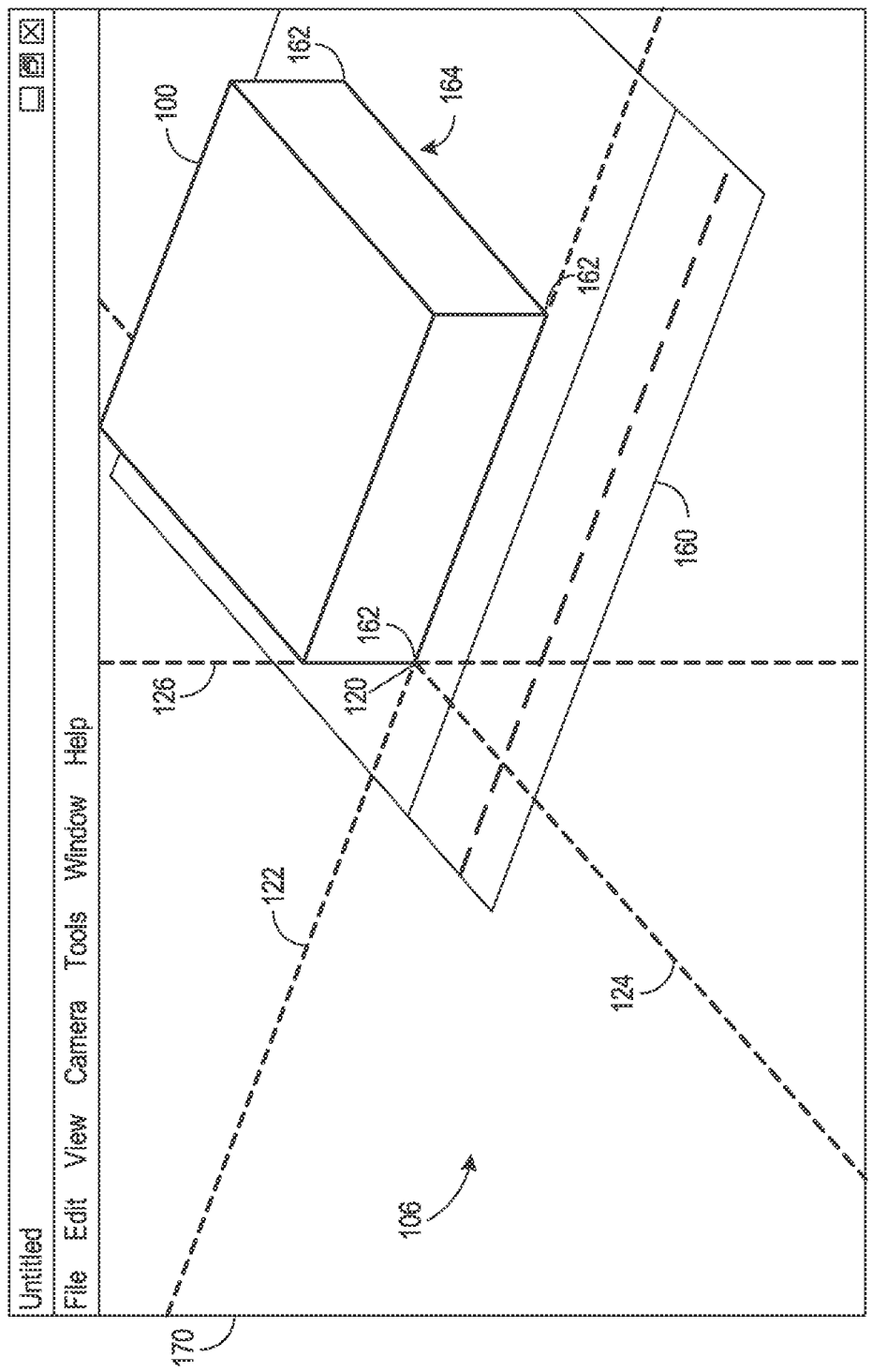
FIG. 6 depicts an exemplary geolocated space displayed in an application window in accordance with a presently described embodiment.

Activation of the control 164 may import the bounded area 160 into the 3D program space 106 of the modeling application 34, as illustrated in FIG. 6. FIG. 6 depicts an application window 170 that may be displayed on the display 20 during execution of the modeling application 34. The application window 170 depicts the 3D program space 106 with the X-, Y-, and Z-axes, 122, 124, and 126, respectively, meeting at the origin 120. The bounded area 160 is copied into the 3D program space 106 and may be displayed as a two-dimensional image (i.e., a plane). By default, the plane defined by the two-dimensional image of the bounded area 160 may be placed within the 3D program space 106 such that the plane is coincident with the plane defined by the X- and Y-axes 122 and 124, and may optionally be placed such that a center (not shown) of the bounded area 160 is coincident with the origin 120. In some embodiments, the user may be able to realign the origin 120 and/or the bounded area 160 to facilitate easier creation (or manipulation) of the 3D model 100. In FIG. 6, for example, the bounded area 160 and/or the origin 120 are aligned such that the corner 156 of the building 152 is aligned with the origin 120.

In some embodiments, every point within the bounded area 160 may have associated with it metadata indicating an altitude. The altitude may be relative to mean sea level, relative to the points next to it, relative to the center of the Earth, etc. Regardless of how the altitudes of various points within the bounded area are indicated, the bounded area 160 may be displayed selectively as either a 2D plane (as depicted in FIG. 6) or as 3D topography. Displaying the bounded area 160 as a 3D topography may allow the user to create the 3D model 100 with greater accuracy. In any event, the 3D model 100 may be constructed such that a base 164 of the 3D model 100 is coincident with the depiction of the building 152 and with the 2D planar depiction or 3D topography of the bounded area 160. Alternatively, the already-constructed 3D model 100 could be aligned with the depiction of the building 152 and with the 2D planar depiction or 3D topography of the bounded area 160.

Of course, with even a single point in the 3D program space 106 associated with a set of coordinates, every other point in the 3D program space 106 may be located referentially and assigned a corresponding set of coordinates. Thus, if the bounded area 160 is a square measuring 1000 feet per side, and the origin 120 is located at [X, Y, Z]=[150, 300, 0], one can determine that the vertices 162 of the bounded area 160 will be located at [−150, −300, 0], [850, −300, 0], [850, 700, 0], and [−150, 700, 0]. Likewise, every point within the 3D program space 106 may be determined relative to a point having known coordinates.

It should be understood that multiple coordinate systems may be in use within the system 10. For instance, the set of coordinates associated with the bounded area 160 in the database 42 and/or with each pixel within the display area 132, may comprise a latitude value and a longitude value (and possibly an altitude value), while the 3D program space 106 in the application 34 may associate each point therein with a set of X, Y, and Z coordinates. Nevertheless, so long as a single point within the 3D program space 106 is associated with a corresponding latitude and longitude, the corresponding latitude and longitude of every point within the 3D program space 106 may be calculated. Accordingly, the location of every point on any surface of the 3D model 100 may be specified by a first set of coordinates in the 3D program space 106 and by a second set of coordinates indicating a real-world position.

Figure 7:
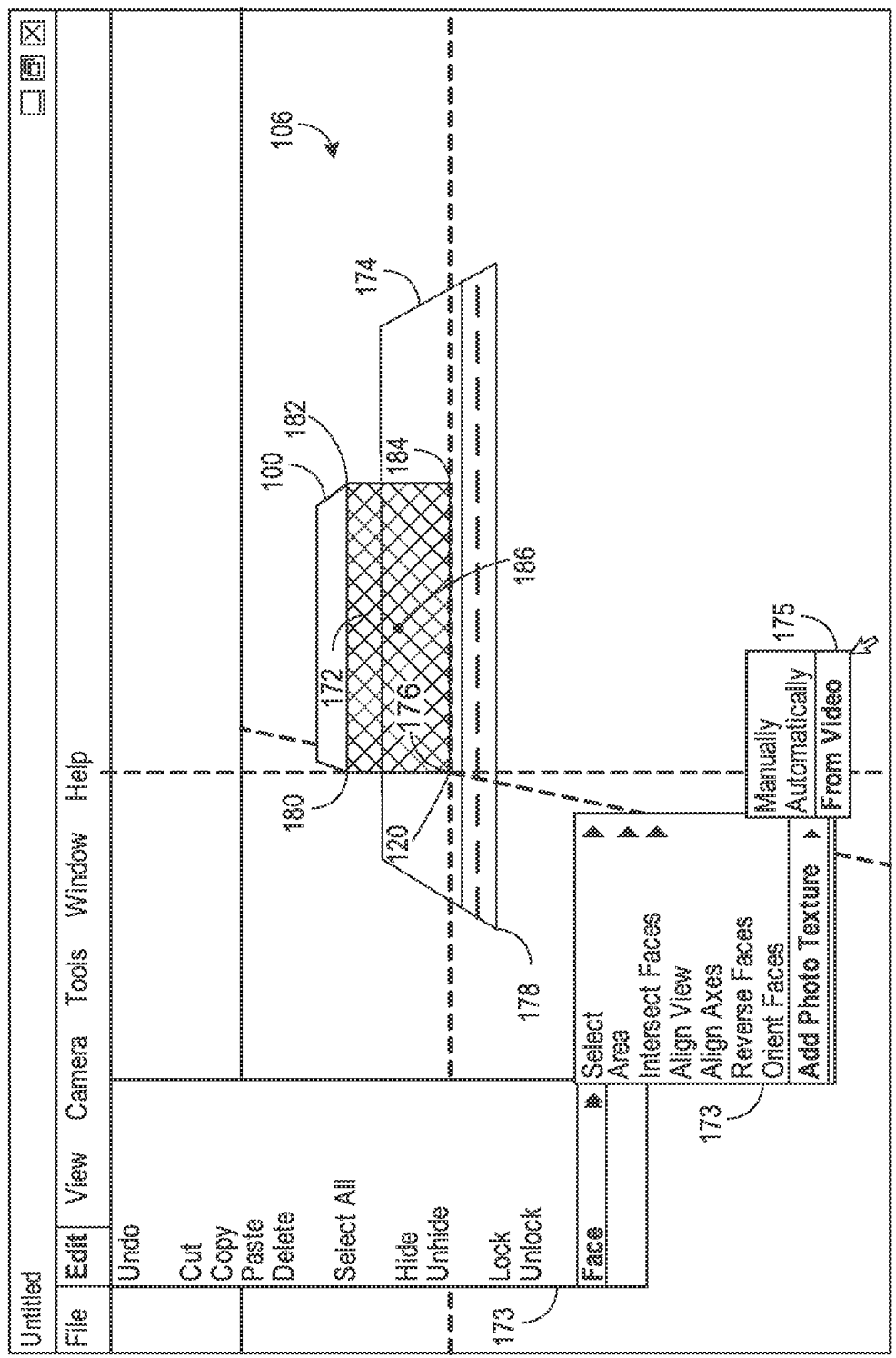
FIG. 7 illustrates an application window displaying a geolocated image and an associated model.

FIG. 7 depicts a geolocated image 174. The geolocated image 174 corresponds to the bounded area 160 and has at least one geolocated point. The geolocated point may be a point 176 corresponding to the origin 120, a point 178 corresponding to a vertex of the geolocated image 174, or any other point in the geolocated image 174. From that geolocated point, any point in the 3D program space 106 may likewise be geolocated. In some embodiments, the geolocated image 174 represents a ground plane in the 3D program space 106 and corresponds to the plane defined by the X- and Y-axes 122 and 124 (i.e., the Z=0 plane in the 3D program space 106). In some embodiments, the geolocated image 174 may, by default, be oriented in the 3D program space 106 such that the positive X-axis 122 is east of the origin 120, the positive Y-axis 124 is north f the origin 120, and the positive Z-axis 126 is above the ground (i.e., "up"). Additionally, in some embodiments, the geolocated image 174 may, by default, be placed in the 3D program space 106 such that the Z-axis 126 passes through the center of the geolocated image 174. Optionally, a user may adjust the origin 120 and, specifically, may adjust the origin 120 to correspond to a corner of the 3D model 100, as depicted in FIG. 7.

Once a geolocated, 3D model 100 is created in the 3D program space 106 of the modeling application 34, the user may select (e.g., using an input device such as a mouse, a touch screen, a stylus, etc.) a desired surface 172 to phototexture as depicted in FIG. 7. It is worth noting, at this point, that texturing a surface does not necessarily require the geolocation of the 3D program space. However, in instances where the 3D program space and the 3D model are geolocated, the photo texturing process may be automated to a greater extent, as described below. In any event, the application 34 (which may be executing on the processor 24 or on a processor of the server 40) receives the selection of the surface to photo texture. The selected surface 172 may have vertices 176, 180, 182, and 184 (if the selected surface 172 is a rectangle, for example) and a center point 186, each of which may be specified by a set of coordinates in the 3D space 106. Having selected the surface 172, the user may activate a control causing the application 34 to execute the video photo texturing routine 35 and, in particular, may activate a control for causing the application 34 to execute a video photo texturing routine. For example, in FIG. 7, the user is depicted selecting a control 175 from a series of pull-down menu items 173, as one of ordinary skill in the art would readily understand. Of course, the modeling application 34 could, additionally or alternatively, include a button control (not shown) that would cause execution of the video photo texturing routine 35. In some embodiments, the modeling application 34 may also give the user the option to execute a manual version of the video photo texturing routine 35 or an automatic version of the video photo texturing routine 35, either of which may acquire the photo texture from a photograph instead of a video.

Figure 8:
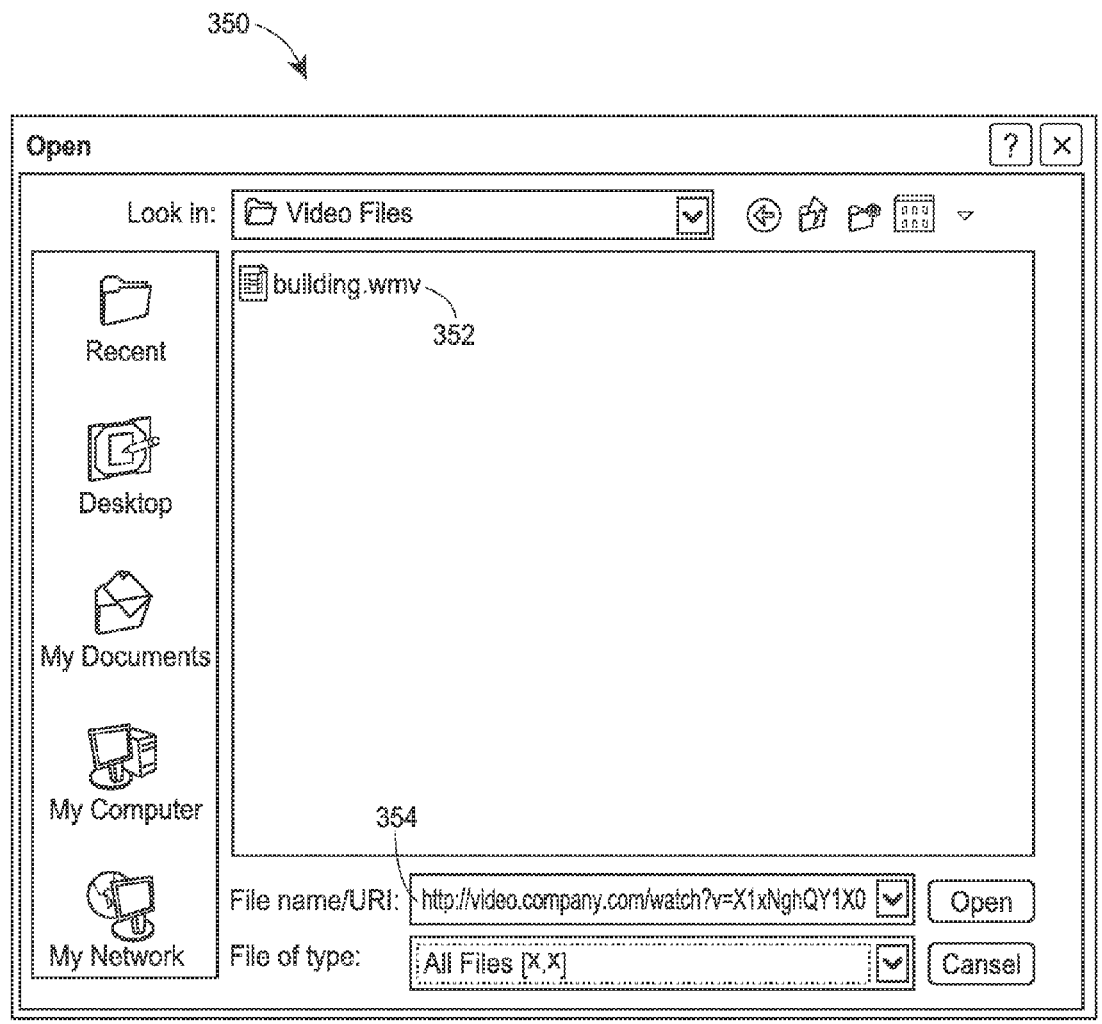
FIG. 8 illustrates a dialog box for allowing a selection of a video from which to capture a photo texturing image.

Upon activating the control 175, the application 34 may execute the video photo texturing routine 35. In some embodiments, the photo texturing routine may be configured to texture the selected surface 172 using a frame of a video file specified by the user. For example, the video photo texturing routine 35 called by activation of the control 175 may allow the user to select a video file hosted by a web service (e.g., in a database such as the database 42) or a video stored locally on the workstation 18, for example in the non-volatile memory 27. Accordingly, execution in the processor 24 of the video photo texturing routine 35 may cause the workstation 18 display 20 to display a dialog box 350, such as that illustrated in FIG. 8. The dialog box 350 may operate, as generally understood, to allow the user to select a local file 352 stored in the non-volatile memory 27, or to input the location (e.g., by specifying a uniform resource identifier (URI) 354) of a video resource stored on a network (e.g., on the Internet). Of course, the video resource need not be a specific file or file type and, in fact, in some embodiments, the URI 354 may indicate a streaming video resource from which a user may select a particular frame for application to the selected surface 172 by the video photo texturing routine 35.

As discussed above, in some embodiments, the video resource/file may include or otherwise be associated with metadata indicating one or both of GPS data and/or compass data. FIGS. 9A and 9B, for example, depict representations of two different video files (or video resources) 360 and 370, respectively, that include GPS and/or compass metadata. For simplicity, the video files and/or video resources 360 and 370 will be described throughout the remainder of this description as video files, though it should be understood that a file, per se, is not required. Instead, as described above, the video resource could, for example, be a video stream, etc. The file 360 includes initial metadata 362A associated with a position 364A at the beginning of the video file 360. The file 360 may additionally have metadata associated with each of a number of other positions within the video file 360. For example, a video capture program having access to GPS and/or compass data may acquire current GPS and/or compass data at regular intervals while recording video imagery. In the video file 360, for instance, metadata 362B-J is associated with positions 364B-J in the video. A plurality of markers or bookmarks associated with the file may indicate positions within the video for which metadata are available.

In some embodiments, the video photo texturing routine 35 may search metadata associated with the selected video file 360 to determine a section of the video file 360 likely to include a video frame including the selected surface 172. For example, a frame of video at a point 366 in the video file 360 may include the best image of the selected surface 172. The video photo texturing routine 35 may, where the selected surface 172 is geolocated within the 3D program space 106, search for and/or select a bookmark having metadata indicating a position closest to the location of the selected surface 172. Alternately or additionally, the video photo texturing routine 35 may search for and/or select a bookmark having metadata indicating that the camera was pointed in the direction of the selected surface 172. In the video file 360 depicted in FIG. 9A, the video photo texturing routine 35 may, for example, determine that the metadata 362D indicates a position closest to the selected surface 172 and/or a compass heading indicating that the camera was pointed at the selected surface 172. Thus, the photo texturing routine 360 may display, by default, (e.g., in a viewer appropriate to the video file type) a first frame at or after the position 364D corresponding to the metadata 362D.

Of course, in some embodiments, a selected video file may include only a single set of metadata for the file (e.g., metadata associated with the beginning or end of the video file). For example, FIG. 9B depicts the video file 370 as having only metadata 372 associated with a starting point 374 of the video file 370. Thus, a user would be left to find an appropriate frame 376 to use as an image for photo texturing.

Figure 10:
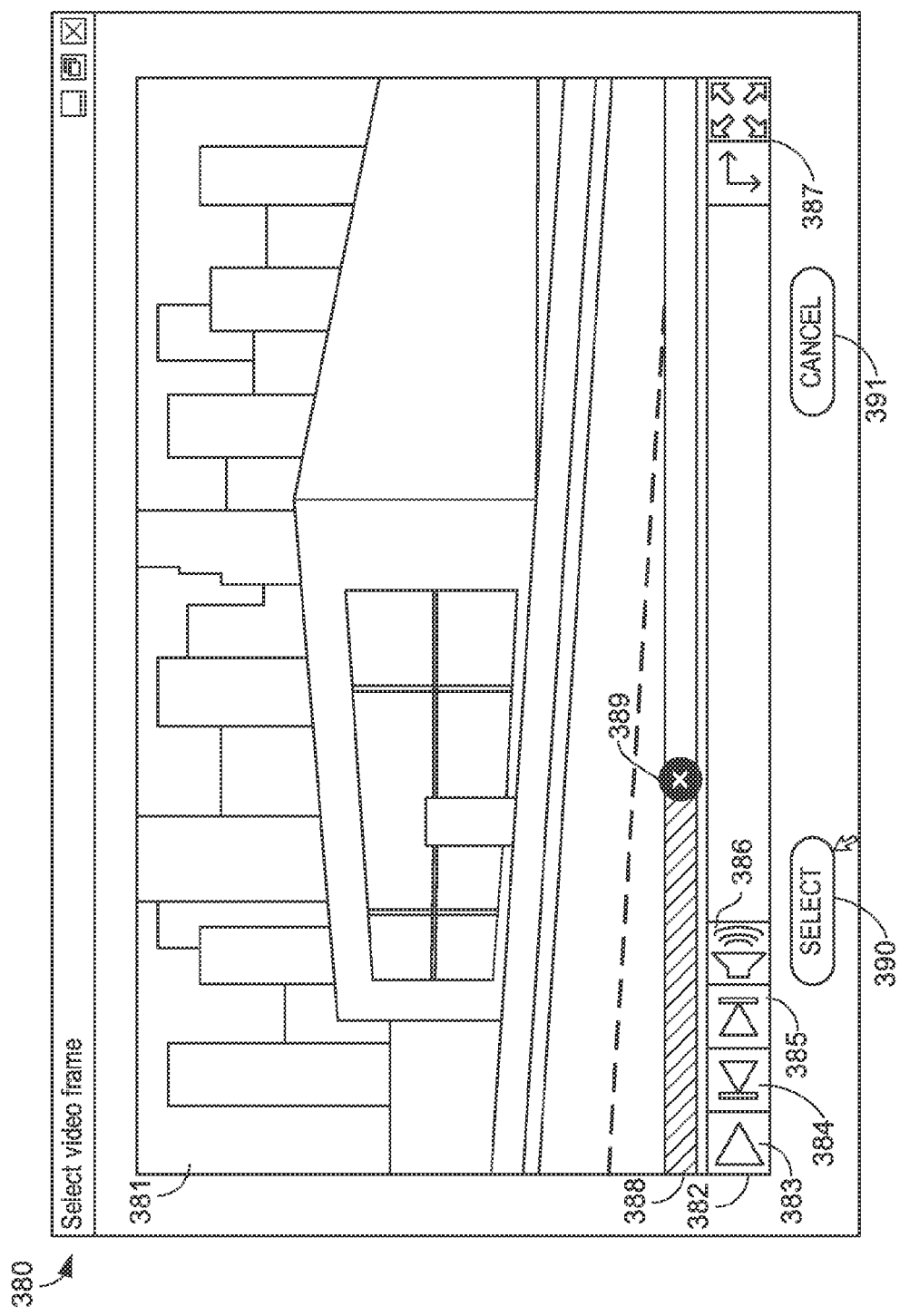
FIG. 10 illustrates a dialog box for selecting from a video a video frame to use to apply a photo texture to a selected surface of a 3D model.

FIG. 10 illustrates an exemplary display 380 for viewing a video and selecting a frame to use to texture the selected surface 172. For example, using the display 380, a user may select a frame of a video that does not have any metadata, or may refine a default selection made by the video photo texturing routine 35 using metadata to select an appropriate bookmark. The display 380 may have a video display area 381 in which the video imagery is displayed. A video control bar 382 may include a number of controls 383-387, for controlling the display 380 and, in particular, may have: a control 383 for playing and/or pausing the motion of the video imagery; a control 384 for displaying the previous frame; a control 385 for displaying the next frame; a control 386 for activating further volume controls, and controls 387 for adjusting the size of the display window or performing other viewing-related tasks. A position indication bar (also known as a "scrubber bar") 388 may indicate the position of the currently displayed frame relative to the entirety of the video and, as generally understood, a position control 389 may allow a user to quickly move to a different point in the video. A select button 390 and a cancel button 391 may, respectively, allow the user to select the currently displayed frame to use as an image to use for photo texturing the selected surface 172, or to cancel the photo texturing routine.

Figure 11:
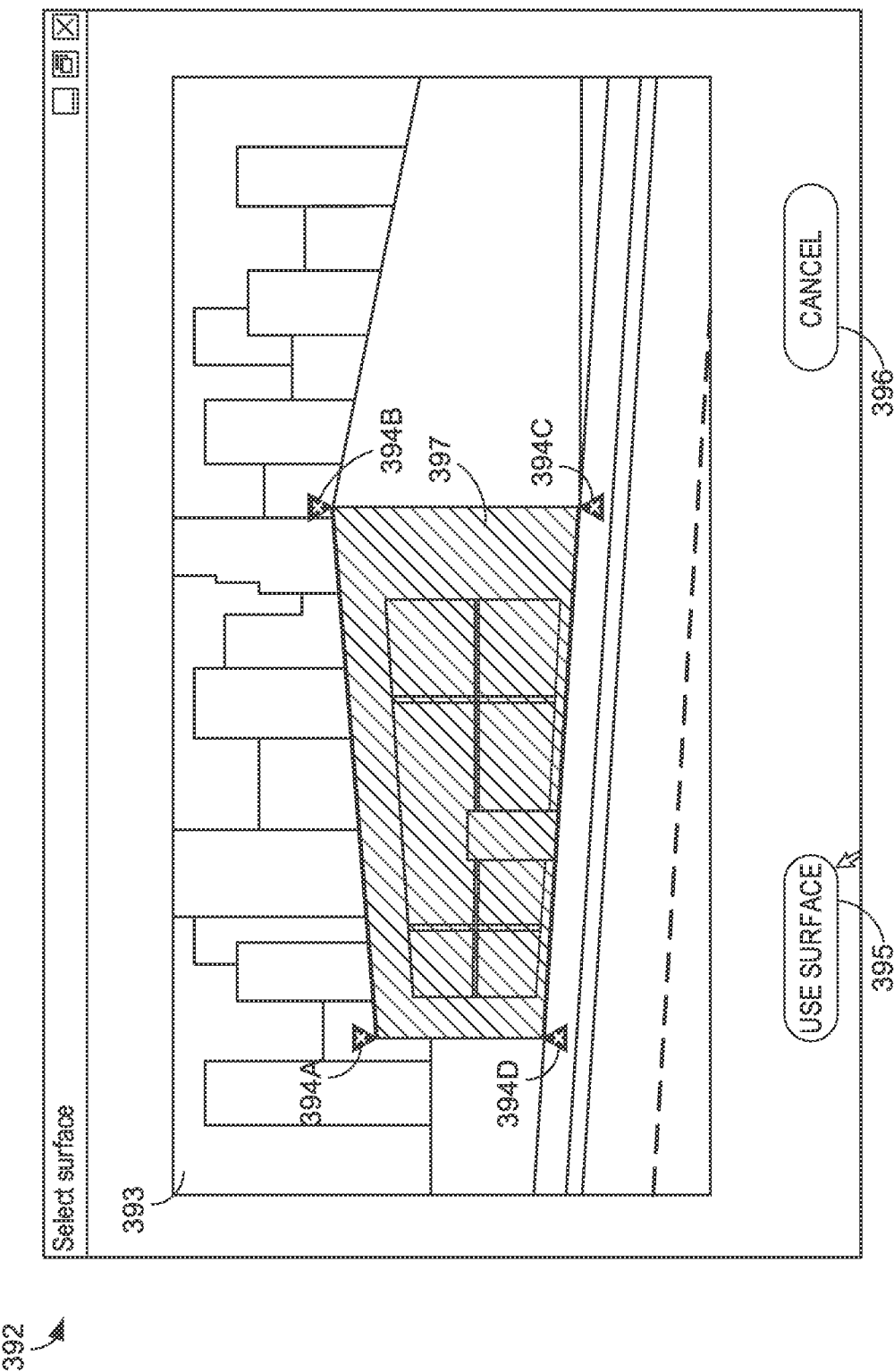
FIG. 11 illustrates a dialog box for receiving a selection of an area of a selected video frame to use to apply a photo texture to a selected surface of a 3D model.

Once the user has selected a video frame for the video photo texturing routine 35 to use to photo texture the selected surface 172, the video photo texturing routine 35 may display a dialog box 392 (see FIG. 11) for selecting an area of the selected frame to apply as a photo texture to the selected surface 172. The dialog box 392 may include a display area 393 that displays the selected video frame. Within the frame, a number of selectable controls 394 may allow the user to select an area of the selected frame that corresponds to the selected surface 172. For example, in the dialog box 392 illustrated in FIG. 11, four controls 394A-394D allow the user to select a tetragonal area 397, which may be indicated, for example, by shading. A control 395 may allow the user to select the area bounded by the controls 394, while a control 396 may allow the user to cancel the execution of the routine or to return to the frame selection dialog box 380.

Figure 12:
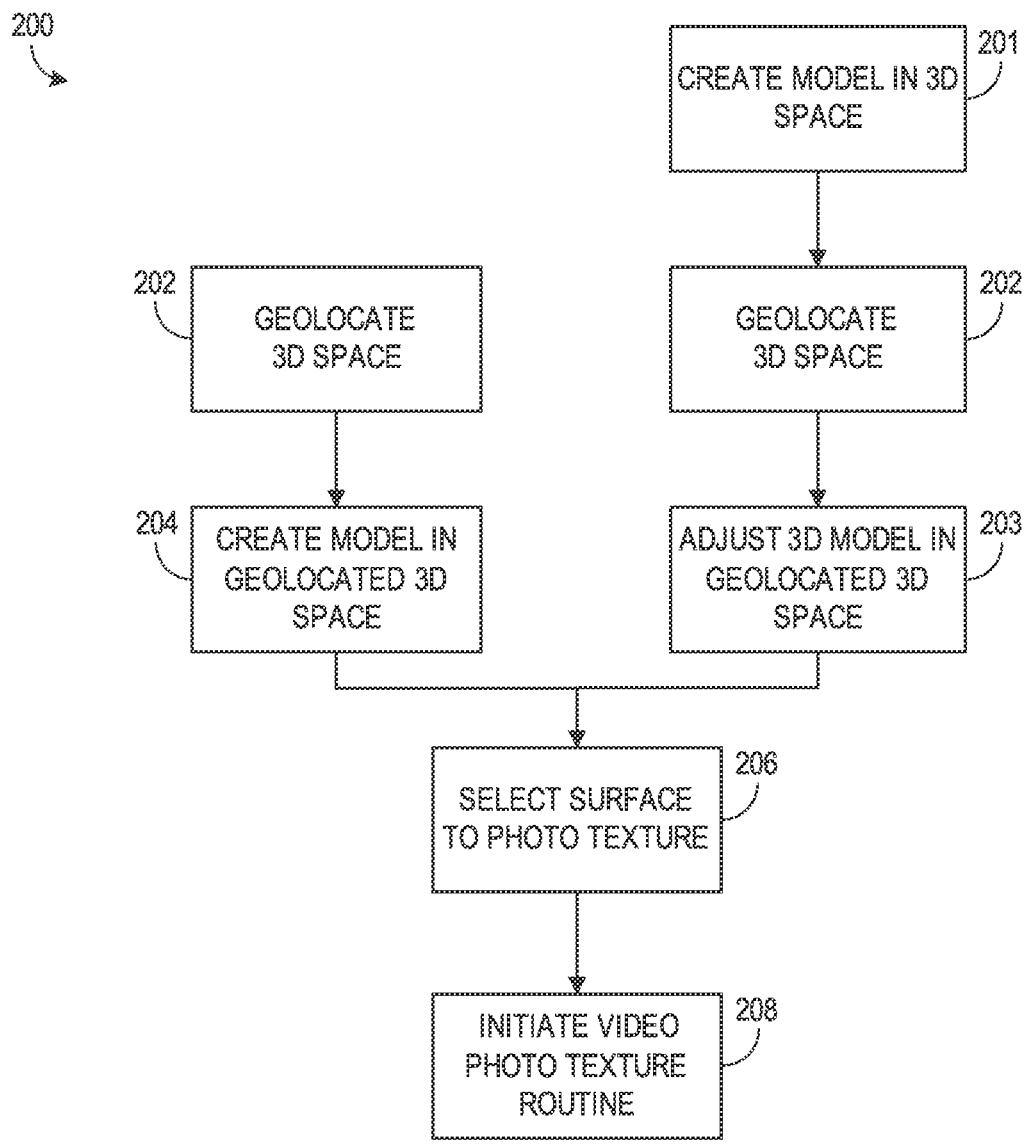
FIG. 12 depicts an exemplary method for initiating a video photo texturing routine.
Figure 13:
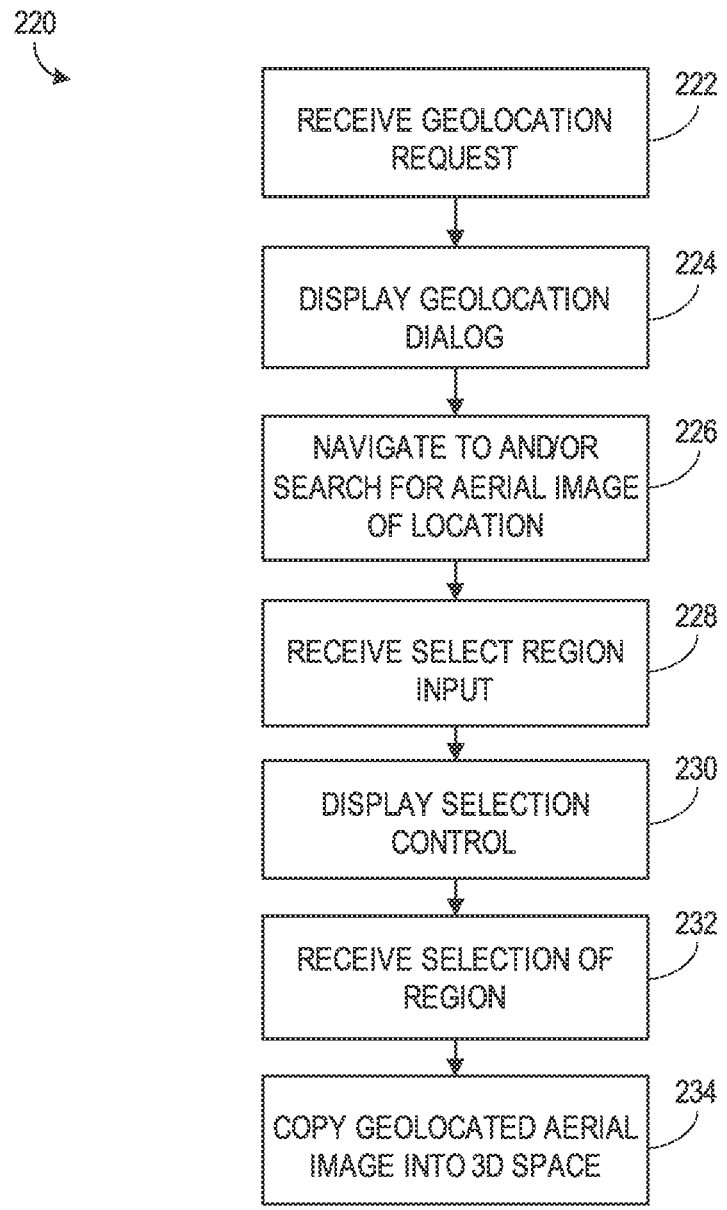
FIG. 13 depicts an exemplary method for performing geolocation of a 3D program space.

FIGS. 12 and 13 are flow charts illustrating, respectively, a method 200 for commencing the process of photo texturing a surface (e.g., the surface 172) of a 3D model (e.g., the 3D model 100) from video, and a method 220 for geolocating the 3D program space 106. Referring first to FIG. 12, as described above, the process of photo texturing the 3D model 100 from video imagery may commence, in some embodiments, by geolocating the 3D program space 106 in which the 3D model 100 is to be created (block 202) and creating the 3D model 100 in the geolocated 3D program space 106 (block 204). In some embodiments, the process of photo texturing the 3D model 100 from video imagery may instead commence by creating the 3D model 100 in the 3D program space 106 (block 201), geolocating the 3D program space 106 (block 202), and, if necessary, adjusting the 3D model 100 in the geolocated 3D program space 106 (block 203). In still other embodiments, geolocation of the 3D program space 106 (and, therefore, the steps indicated at blocks 202, 203) is omitted. In any event, a surface (e.g., the surface 172) to be photo textured may be selected (block 206) and the video photo texturing routine 35 may be executed (block 208).

The geolocation process (block 202; method 220) commences when the application 34 receives a geolocation request (block 222) and, in response to receiving the request executes the geolocation routine 37 and displays the geolocation dialog box 130 (block 224). As described above, the user may navigate to, or search for, an image (which may be an aerial image) of the desired location (i.e., the location of the real-world structure represented by the 3D model 100) (block 226). This may involve sending a search term from the routine 37 to the server 40, and receiving in response to the search term a corresponding image from the server 40, which image the server 40 may retrieve from the database 42. The user, having located in the geolocation dialog box 130 the desired region, may manipulate a control in the geolocation routine 37 to indicate a desire to select a region (block 228). In response to receiving the user input (block 228), the geolocation routine 37 may display a selection control (e.g., the bounded area 160 and the plurality of vertices 162) (block 230) and the user may manipulate the selection control to specify a desired area. The geolocation routine 37 may next receive a selection of a region (e.g. the bounded area 160) to copy into the 3D program space 106 of the application 34 (block 232). This may be accomplished, for example, when the user, having adjusted the vertices 162, indicates that the bounded area 160 is adjusted according to the user's desire by manipulating a control (e.g., clicking on a button) in the geolocation dialog box 130 (block 234). Having received the selection of a region, the geolocation routine 37 may copy the selected region of the geolocated image into the 3D program space 106 of the modeling application 34.

In embodiments, the geolocated image copied into the 3D program space 106 includes at least one geolocated point specified by a first coordinate system such as latitude and longitude (and, in some embodiments, altitude). Of course, while the geolocated point(s) are described herein as designated by latitude and longitude, the geolocated point(s) need not be specified by a latitude and longitude, but could instead be specified in any available coordinate system.

To automatically apply a photo texture to the selected surface 172 from video, the application 34 and/or the video photo texturing routine 35 may, perhaps cooperatively: (1) find one or more videos likely to include one or more frames capturing an image of the selected surface of the real-world structure modeled by the 3D model 100 and/or receive a selection of a video from which to select a frame that includes an image of the selected surface; (2) select from the selected frame a portion of the image corresponding to the selected surface; (4) map the selected portion to the selected surface; and (5) apply the selected portion to the selected surface according to the mapping. Accomplishing these tasks may require that the application 34 and/or the video photo texturing routine 35 transform one or more sets of coordinates through several coordinate spaces. That is, the application 34 and/or the video photo texturing routine 35 may operate or cooperate to change a point or a set of points from one coordinate system to another coordinate system.

Figure 14:
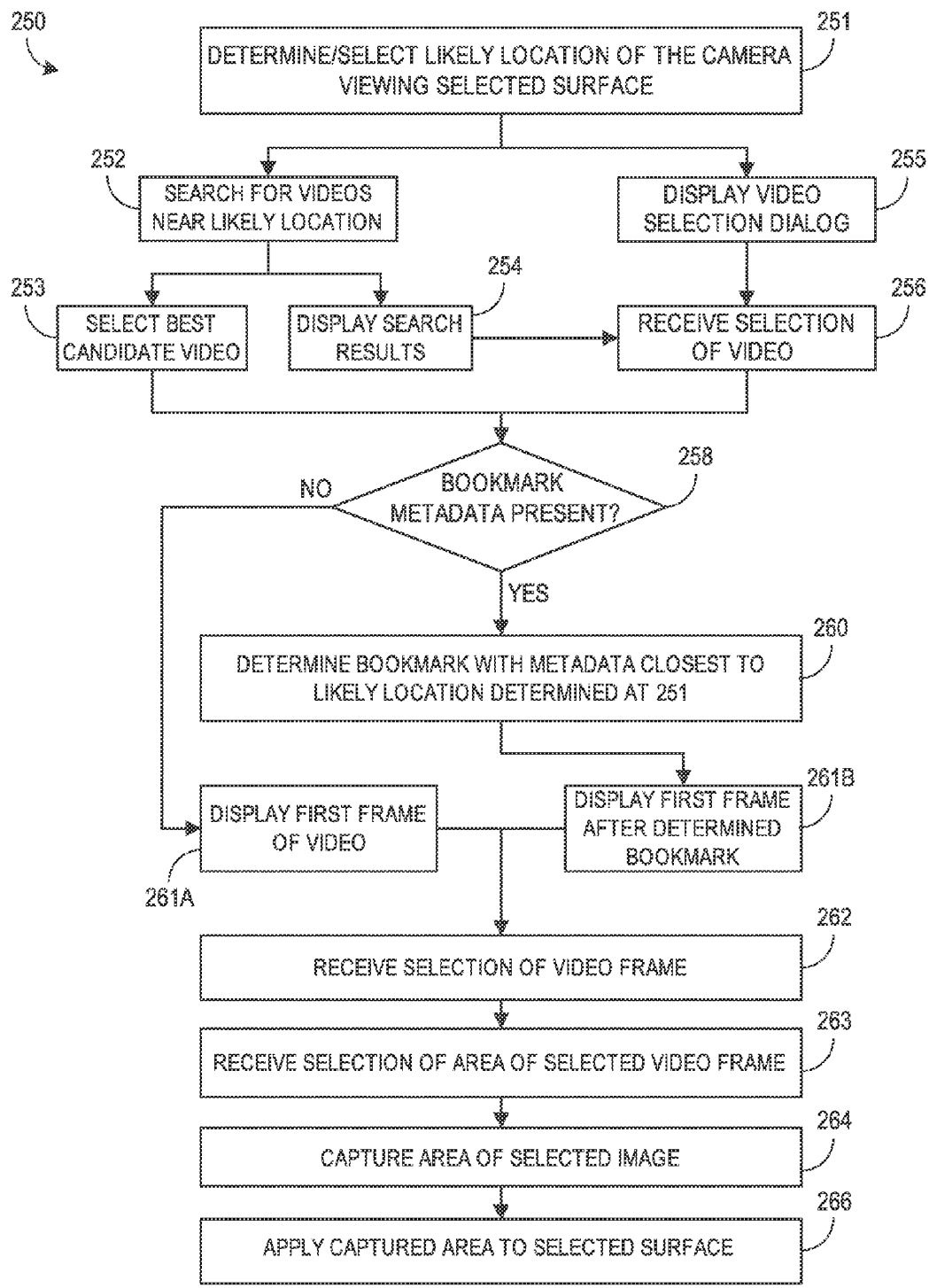
FIG. 14 depicts alternative methods for video photo texturing a selected surface of a 3D model in accordance with presently described embodiments.

Turning now to FIG. 14, a flow chart depicts an exemplary method 250, executed by the video photo texturing routine 35, for applying a photo texture to a selected surface (e.g., the selected surface 172) from video.

In some embodiments in which the 3D program space 100 has been geolocated or in which location data for the selected surface 172 has been otherwise provided, the video photo texturing routine 35 may determine or select a likely location 190 of a video camera viewing the selected surface (block 251). To determine and select a likely location of a video camera viewing the selected surface 172 (block 251), the video photo texturing routine 35 may execute a method 280 depicted in FIG. 15. In some embodiments, the first step in calculating the likely viewing point is calculating, determining, or retrieving a set of coordinates corresponding to the center point 186 (see FIG. 7) of the selected surface 172 (block 284). In various embodiments, the set of coordinates corresponding to the center point 186 of the selected surface 172 may be calculated or determined by the modeling application 34 and stored for later retrieval and use by the video photo texturing routine 35. However, in some embodiments, the set of coordinates corresponding to the center point 186 of the selected surface 172 may be calculated or otherwise determined by the video photo texturing routine 35, and may include first determining for each of the vertices 176, 180, 182, and 184 a set of coordinates corresponding to the location in the 3D space 106 of the vertex (block 283). Further, in some embodiments, the selected surface 172 may be represented by a set of vertices (e.g., a set of four vertices) even if the selected surface 172 is not rectangular. For example, the selected surface 172 could be a circular surface, specified by four vertices defining a square circumscribing the circular surface.

Figure 15:
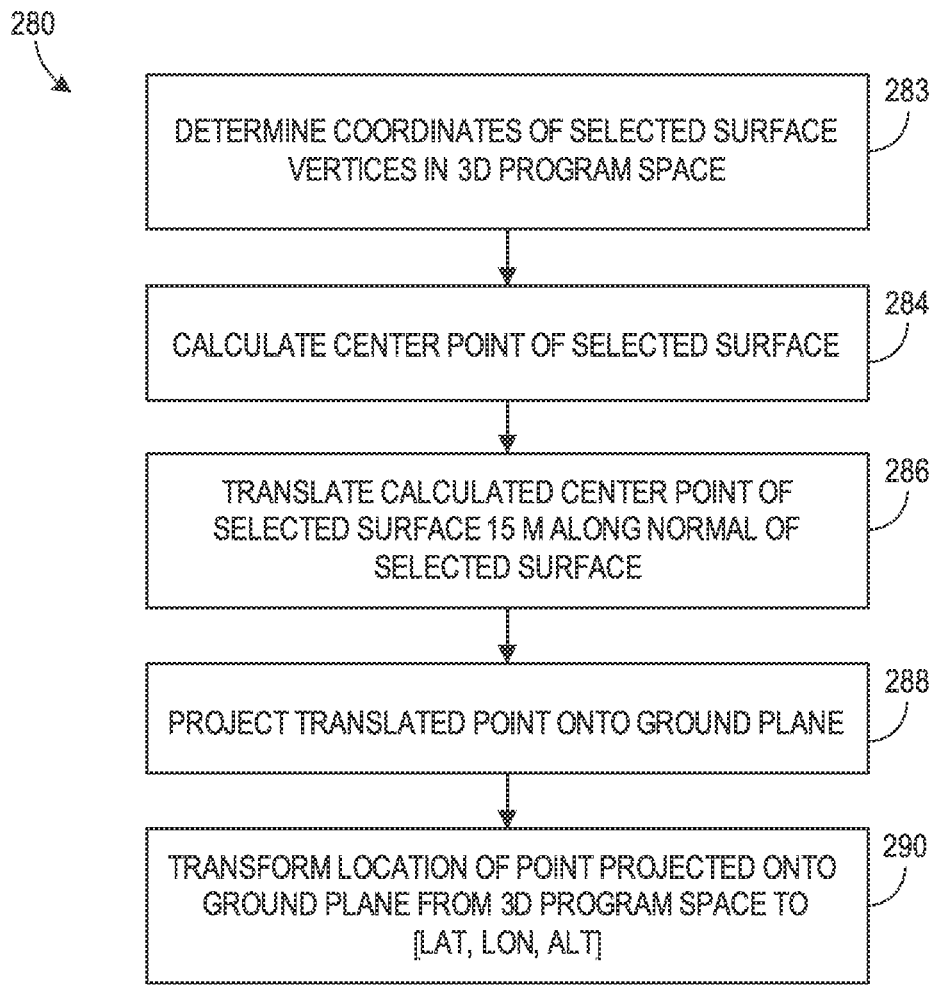
FIG. 15 depicts an exemplary method for determining a likely location of a camera viewing the surface selected to be photo textured.
Figure 16:
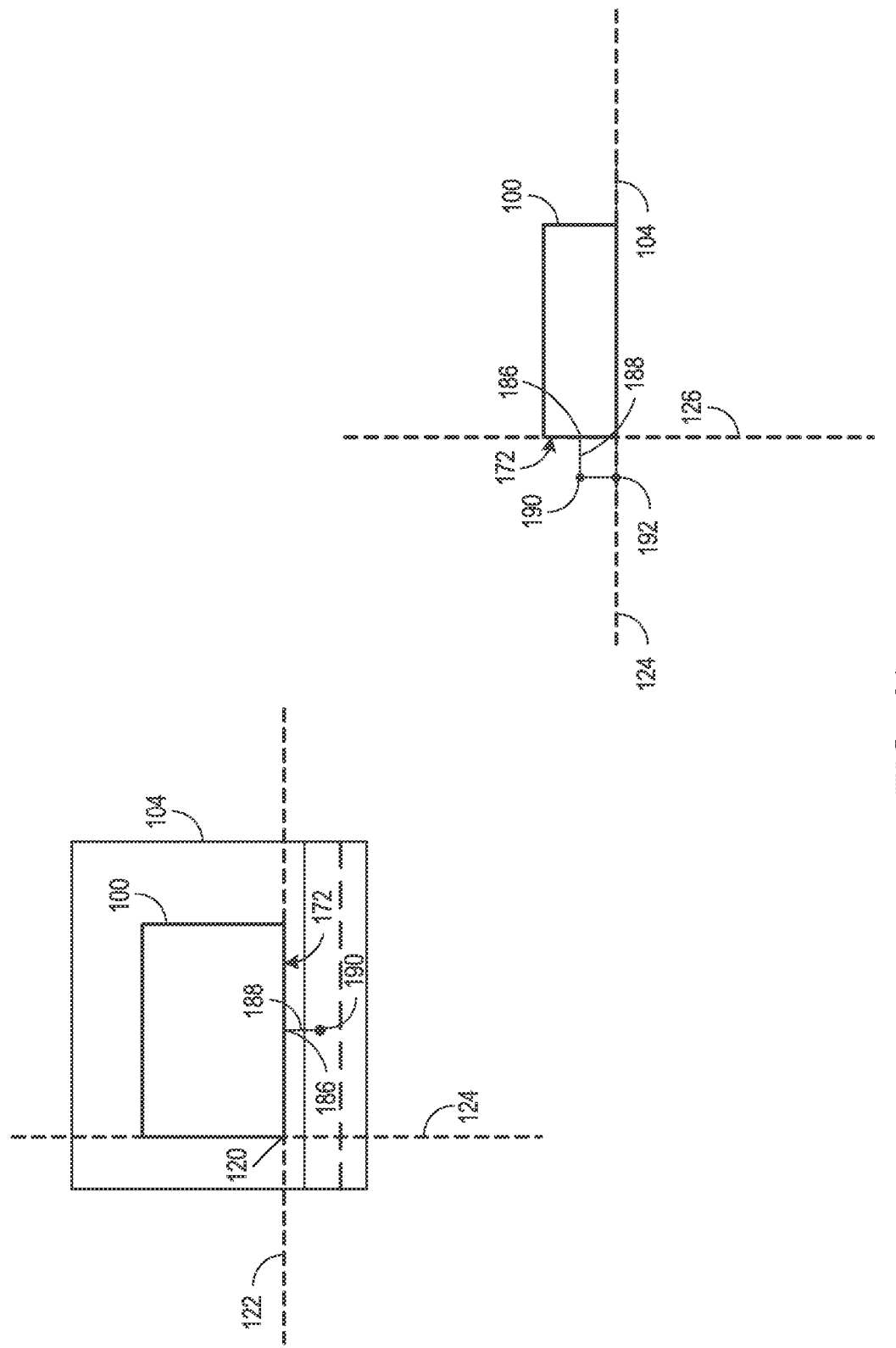
FIG. 16 illustrates the process of calculating a likely location of a camera viewing the surface selected to be photo textured in accordance with the method of FIG. 15.

Referring now to FIGS. 15 and 16, to determine a likely location of a video camera viewing the selected surface 172, the video photo texturing routine 35 may next translate the center point 186 a predefined distance (e.g. 15 meters) along the normal 188 of the selected surface 172 (block 286). The video photo texturing routine 35 may then project this translated point 190 onto the ground plane 104 (block 288) to determine a position 192 from which an image would likely be captured. A set of coordinates in the 3D program space 106 corresponds to the position 192. The video photo texturing routine 35 may then transform this set of coordinates from the 3D program space 106 to a set of coordinates used to geotag video imagery (e.g., latitude, longitude, and altitude) (block 290).

Turning again to FIG. 14, using that information, the video photo texturing routine 35 may, in some embodiments, initiate a search for geotagged videos located near the determined likely location 190 (block 252). Of course, the video photo texturing routine 35 may initiate a search of web hosted videos (e.g., videos on YouTube.com), in some embodiments, may initiate a search of locally stored videos (e.g., stored on the non-volatile memory 27, in some embodiments, and/or may initiate a search of both web hosted videos and locally stored videos. Thereafter, the video photo texturing routine 35 may select from the search results the best candidate video (block 253) or, alternatively, may display a list of search results (block 254).

In some embodiments, however, instead of searching for videos near the determined likely location 190, the video photo texturing routine 35 may display the video selection dialog 350 (see FIG. 8) (block 255).

Regardless of whether the video photo texturing routine 35 searches for videos according to the determined likely location 190 or displays the video selection dialog 350, the video photo texturing routine 35 next receives a selection of a video (block 256).

Once the video photo texturing routine 35 has received a selection of a video (block 256) from which a frame will be selected to use to texture the selected surface 172, it is necessary for a frame of the selected video to be determined or selected to be used. In some embodiments, the video photo texturing routine 35 may search for the presence of bookmark metadata in the selected video (block 258). If bookmark metadata is not present in the selected video file, or in embodiments in which bookmark metadata is not supported, the video photo texturing routine 35 may proceed to display the first frame of the selected video file (block 261A) after receiving the selection of the video file (block 256). Alternately, if bookmark metadata is found to be present in the selected video file, the video photo texturing routine 35 may determine the bookmark within the video file that indicating a position closest to the likely location 190 determined at block 251 (block 260), and display the first frame after the determined bookmark (block 261B).

The video photo texturing routine 35 next receives a selection of video frame from which an area will be selected to apply as a photo texture to the selected surface 172 (block 262). Next, the video photo texturing routine 35 receives a selection of the area of the selected video frame (block 263). Having received the selection of the area of the selected video frame, the video photo texturing routine 35 captures the selected area (block 264) and uses standard UV mapping techniques to apply the captured area as a texture to the selected surface (block 266).

In some embodiments, the 3D modeling application 34 may call (i.e., instantiate) the video photo texturing routine 35 multiple times, successively or concurrently, to photo texture multiple surfaces of the 3D model 100. For example, prior to initiating the video photo texturing routine 35 (FIG. 12 at block 208), a user may select multiple surfaces of the 3D model 100 (FIG. 12 at block 206).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 16 may include but is not limited to any combination of a LAN, a MAN, a WAN, a mobile, a wired or wireless network, a private network, or a virtual private network. Moreover, while only one workstation 18 is illustrated in FIG. 1 to simplify and clarify the description, it is understood that any number of workstations 18 are supported and can be in communication with the server 40.

Additionally, certain embodiments are described herein as including logic or a number of components, modules, routines, applications, or mechanisms. Applications or routines may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently or semi-permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a photo texturing system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for texturing a 3D model from video through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for applying a photo texture to a 3D model of a real-world object, the method comprising:
   receiving geolocation information for a point in a model space in which the 3D model is created;

receiving a selection of a surface of the 3D model;
receiving a request to apply to the selected surface a photo texture acquired from a video resource;
receiving a selection of the video resource from which to acquire the photo texture;
receiving a selection of a video frame of the video resource;
using information stored as metadata with the selected video resource to determine a video frame of the video resource to display;
receiving a selection of an area of the selected video frame to apply as a photo texture to the selected surface; and
applying the selected area of the selected video frame to the selected surface,
wherein the video resource includes geotagging metadata indicating camera locations associated with a plurality of bookmarks of the video resource, and
wherein determining a video frame of the video resource to display comprises:
    selecting a bookmark having associated geotagging metadata meeting pre-determined criteria relative to the received geolocation information; and
    displaying the first frame of video after the bookmark, and
wherein selecting a bookmark having associated geotagging metadata meeting pre-determined criteria relative to the received geolocation information comprises selecting a bookmark having associated geotagging metadata indicating a one of the camera locations having a position closest to a calculated best camera location.

2. The method of claim 1, further comprising:
initiating a search of metadata associated with a plurality of video resources to determine one or more video resources according to the received geolocation information.

3. The method of claim 1, further comprising determining the likely best camera location by:
    finding a center point of the selected surface; and
    determining a location a pre-determined distance from the center point.

4. The method of claim 1, wherein receiving a selection of the video resource from which to acquire the photo texture comprises receiving a selection of a video file stored locally on a computer implementing the method.

5. The method of claim 1, wherein receiving a selection of the video resource from which to acquire the photo texture comprises receiving a selection of a video file stored remotely and accessed via a network connection.

6. The method of claim 1, wherein applying the selected area of the selected video frame to the selected surface comprises:
    copying the selected area of the selected video frame; and
    UV mapping the created second image onto the selected surface of the 3D model.

7. A system comprising:
a storage device storing a plurality of video resources;
a display device;
a processor communicatively coupled to the storage device and to the display device; and
a memory device storing a set of machine readable instructions executable by the processor, the instructions operable to cause the processor to:
facilitate the creation of a 3D model in a 3D space represented on the display device;
receive geolocation information for a point in the 3D space in which the 3D model is created;
receive a selection of a surface of the 3D model;
receive a request to apply to the selected surface a photo texture acquired from a video resource stored on the storage device;
receive a selection of the video resource from which to acquire the photo texture;
use information stored as metadata with the selected video resource to determine a video frame of the video resource to display;
receive a selection of a video frame of the video resource;
receive a selection of an area of the selected video frame to apply as the photo texture to the selected surface; and
apply the selected area of the selected video frame to the selected surface, wherein the video resource includes geotagging metadata indicating camera locations associated with a plurality of bookmarks of the video resource, each bookmark marking a position within the video resource, and wherein determining a video frame of the video resource to display comprises:
selecting a bookmark having associated geotagging metadata meeting pre-determined criteria relative to the received geolocation information; and
displaying the first video frame of the video after the bookmark, and wherein selecting a bookmark having associated geotagging metadata meeting pre-determined criteria relative to the received geolocation information comprises selecting a bookmark having associated geotagging metadata indicating a one of the camera locations having a position closest to a calculated best camera location.

8. The system of claim 7, wherein the instructions are further operable to cause the processor to:
    initiate a search of metadata associated with a plurality of video resources to determine one or more video resources according to the received geolocation information.

9. The system of claim 7, wherein the instructions are further operable to cause the processor to determine the likely best camera location by:
    finding a center point of the selected surface; and
    determining a location a pre-determined distance from the center point.

10. The system of claim 7, wherein the storage device is a web server coupled to the processor via a network connection.

11. A tangible, non-transitory computer-readable medium storing instructions, the instructions when executed by a processor, operable to cause the processor to:
    create a 3-dimensional (3D) digital model of a real-world object;
    receive geolocation information for a point in a 3D space in which the 3D model is created;
    receive a selection of a surface of the 3D model; and
    receive a request to apply to the selected surface a photo texture acquired from a video frame of a video resource and, in response to the request:
    receive a selection of the video resource that includes the video frame from which to acquire the photo texture;
    use information stored as metadata with the selected video resource to determine a video frame of the video resource to display;
    receive a selection of the video frame of the video resource;
    receive a selection of an area of the selected video frame to apply as a photo texture to the selected surface; and
    apply the selected area of the selected video frame to the selected surface, wherein the video resource includes geotagging metadata indicating camera locations associated with a plurality of bookmarks of the video resource, each bookmark marking a position within the video resource, and wherein determining a video frame of the video resource to display comprises:

selecting a bookmark having associated geotagging metadata meeting pre-determined criteria relative to the received geolocation information; and displaying the first video frame of the video after the bookmark, and wherein selecting a bookmark having associated geotagging metadata meeting pre-determined criteria relative to the received geolocation information comprises selecting a bookmark having associated geotagging metadata indicating a one of the camera locations having a position closest to a calculated best camera location.

12. The computer-readable medium of claim 11, wherein the instructions are further operable to cause the processor to:

receive geolocation information for a 3D space in which the model is created;

determine geolocation information for one or more points of the 3D model; and initiate a search for one or more video resources according to one or both of the received geolocation information and the determined geolocation information, and wherein receiving a selection of a video resource comprises receiving a selection of one of a plurality of search results returned by the initiated search.

13. The computer-readable medium of claim 12, wherein receiving a selection of a video resource comprises receiving a selection of a web-hosted video resource.

14. The computer-readable medium of claim 11, wherein applying the selected area of the selected video frame to the selected surface comprises:

copying the selected area of the selected video frame; and

UV mapping the created second image onto the selected surface of the 3D model.

* * * * *